United States Patent [19]
Schreiner, Jr. et al.

[11] Patent Number: 6,073,907
[45] Date of Patent: Jun. 13, 2000

[54] REMOVABLE AND INTERCHANGEABLE VALVE ACTUATOR SYSTEM

[75] Inventors: Michael R. Schreiner, Jr., Port Washington; John H. Schlais, Jr., New Berling, both of Wis.

[73] Assignee: Erie Manufacturing Company, Milwaukee, Wis.

[21] Appl. No.: 08/966,379

[22] Filed: Nov. 7, 1997

[51] Int. Cl.[7] ................................................. F16K 31/05
[52] U.S. Cl. ............................... 251/129.12; 251/129.02; 251/129.03; 251/291
[58] Field of Search ........................... 251/129.11, 129.12, 251/129.13, 129.02, 129.03, 291; 137/271, 269

[56] References Cited

U.S. PATENT DOCUMENTS

| | | | |
|---|---|---|---|
| 3,319,646 | 5/1967 | Smulka | 137/269 |
| 4,549,446 | 10/1985 | Beeson | 251/129.03 |
| 4,705,063 | 11/1987 | Robinson | 251/129.12 |

FOREIGN PATENT DOCUMENTS

| | | |
|---|---|---|
| 84 07 586 | 5/1984 | Germany . |
| 90 10 608 | 9/1990 | Germany . |
| WO 83/00368 | 2/1983 | WIPO . |

OTHER PUBLICATIONS

"Gold Series Zone Valves" Information Sheet, Taco, Inc., 1160 Cranston Street, Cranston, RI 02920, Catalog 100–3.3, undated.
"MZV Motorized Zone Valve" Information Sheet, Taco, Inc., 1160 Cranston Street, Cranston, RI 02920, Catalog 100–2.7, undated.
"Honeywell, V4043, V4044 Fan Coil Valves, V8043, V8044 Zone Valves" Installation Manual, Form No. 95–6983–10, Honeywell, Inc. 1988.
"VG5000 Series Forged Brass Valves 1/2 Through 1 in., Two–Way Normally Closed And Three–Way", Johnson Controls, FANs 977, 125, 1628.3, Product/Technical Bulletin VG5000, Issue Date Nov. 1996.
"Taco Motorized Zone Valve Installation Instructions, 24 VAC Applications" No. 102–064, 1993, Taco, Inc., 1160 Cranston Street, Cranston, RI 02920.

*Primary Examiner*—Kevin Shaver
*Assistant Examiner*—Eric Keasel
*Attorney, Agent, or Firm*—Terrence Martin; Jules Jay Morris; Sean D. Detweiler

[57] ABSTRACT

A valve actuator assembly is provided for use with a valve body. The valve body includes a valve member for controlling flow of fluid through the valve body, which is mounted to a valve stem having an external connector portion. The valve body includes engagement structure, and the valve actuator is removably engageable with the valve body via a latching member movable into and out of engagement with the engagement structure. The valve body is configured such that a valve actuator providing either normally closed or normally open operation can be mounted to the valve body. The valve actuator includes a motor having an output engageable with a drive gear, which in turn is engageable with the valve stem when the valve actuator is mounted to the valve body. The actuator can be changed from providing normally open operation to providing normal closed operation simply by replacing one drive gear of the valve actuator with another. The valve actuator is configured such that the actuator can be used with two different types of valve bodies, such as a two-way valve body and a three-way valve body.

51 Claims, 15 Drawing Sheets

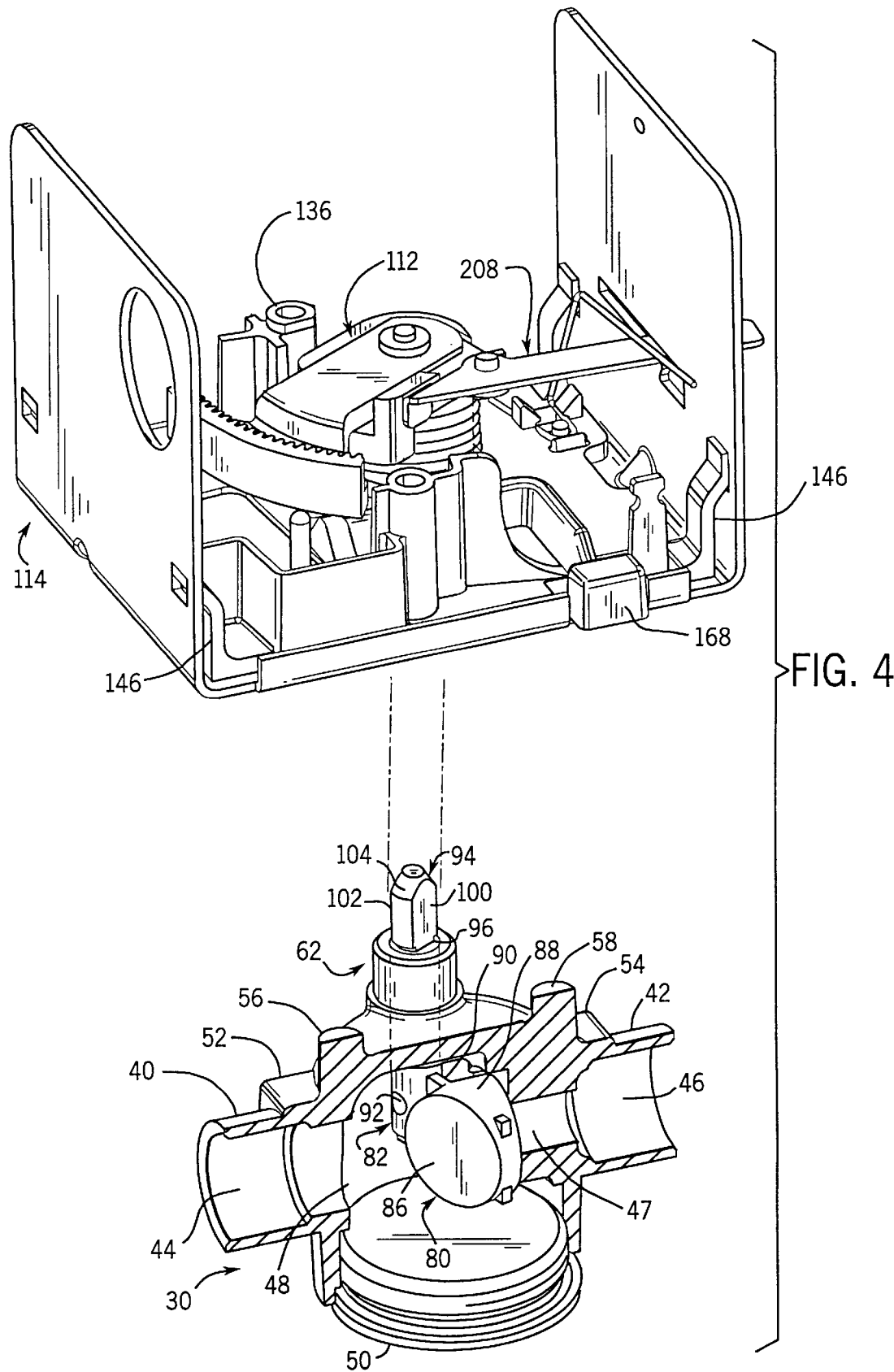

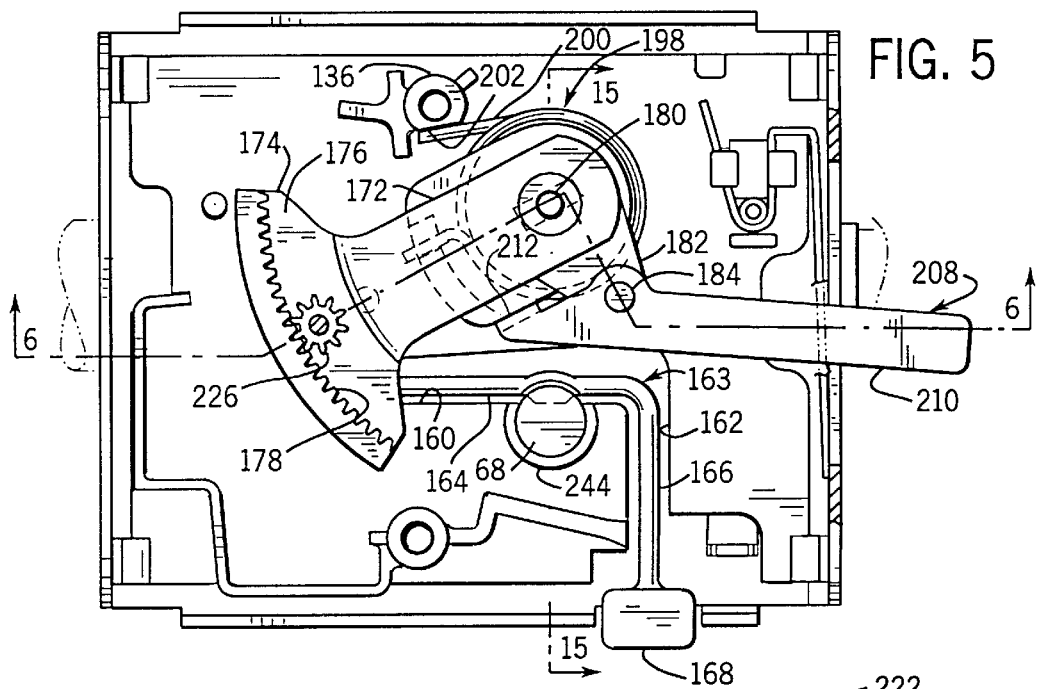
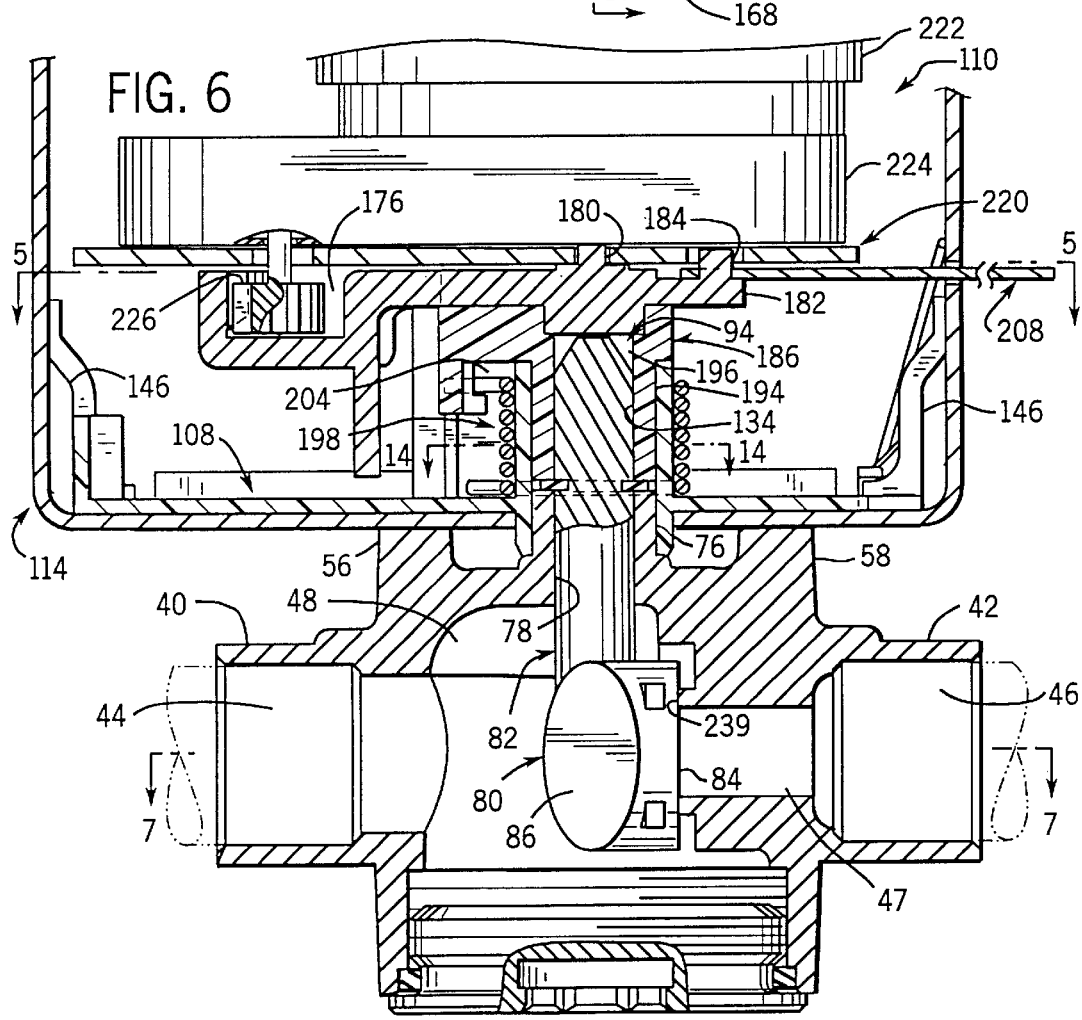

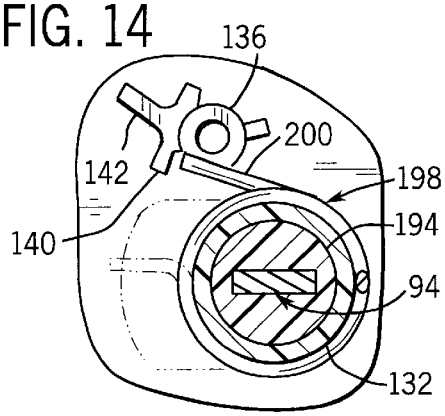
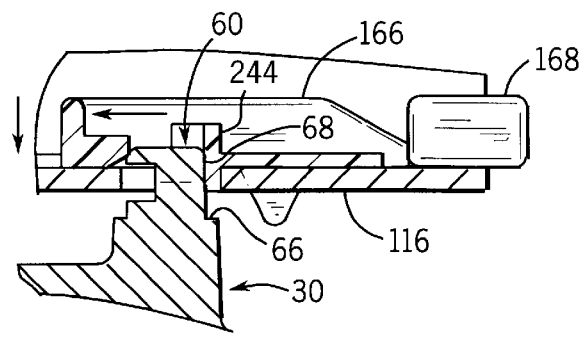
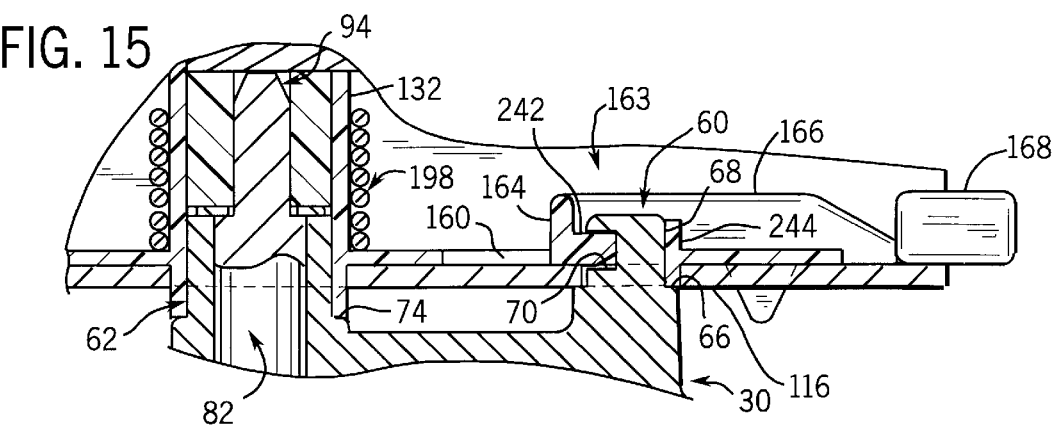
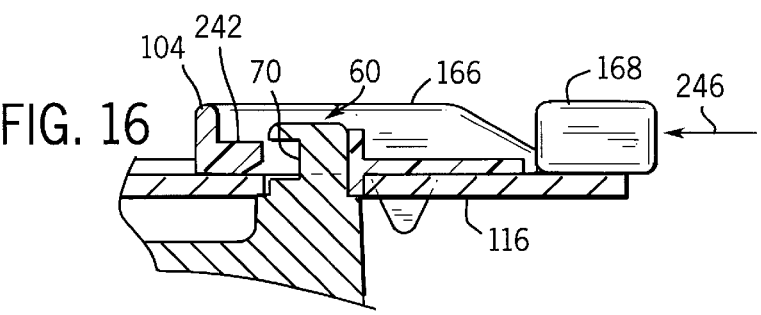
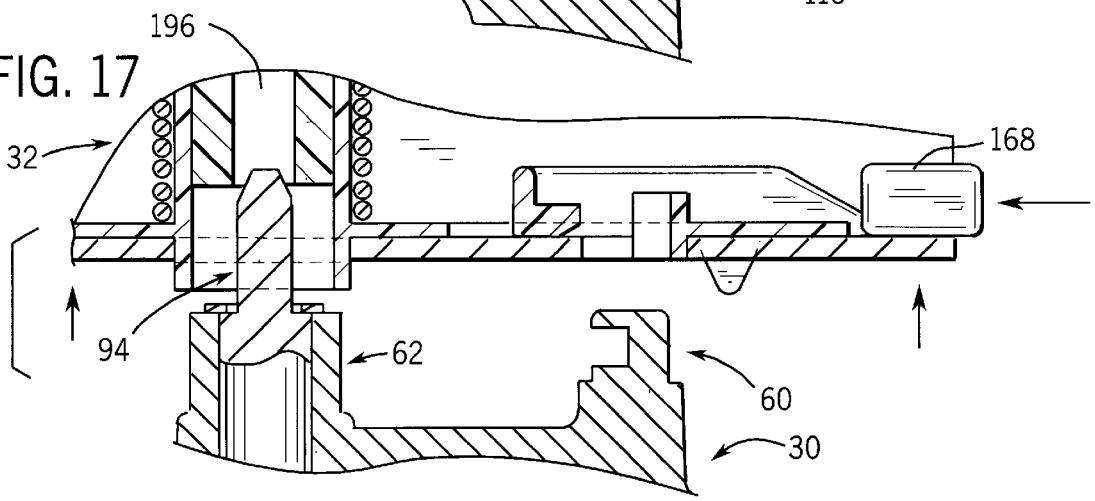

REMOVABLE AND INTERCHANGEABLE VALVE ACTUATOR SYSTEM

BACKGROUND AND SUMMARY OF THE INVENTION

This invention relates to valves, and more particularly to a valve system in which an actuator assembly is mounted to a valve body for providing operation of a valve member disposed within a valve body.

Valves are used in a variety of applications to control fluid flow. Typically, a valve includes a movable valve member disposed within an internal passage or cavity in communication with a line, and the valve member is movable in response to an actuator to vary the position of the valve member to control the flow of fluid in the line.

One type of valve utilizes a valve body adapted to be plumbed into a line, to which a valve member is mounted for movement through a range of operating positions to control flow of fluid through the valve body in response to operation of an actuator assembly. Typically, the valve member is movable between an open position and a closed position, and the valve member is mounted to an operating member such as a valve stem, which in turn is pivotably mounted to the valve body. The valve stem in turn is interconnected with the actuator assembly which controls pivoting movement of the valve stem to thereby move the valve member through its range of operating positions.

The valve actuator assembly generally includes a housing, a motor mounted within the housing and including an output, and a drive mechanism mounted to the housing and interconnected with the motor output. The drive mechanism in turn is interconnected with the valve stem, such that operation of the motor results in movement of the drive mechanism, through the motor output, to thereby cause movement of the valve stem through the drive mechanism. In the past, the valve body has been permanently mounted to the housing of actuator assembly, such that the actuator assembly and valve body are manufactured and sold as a unit. While this arrangement works well and has generally been found to be satisfactory, it entails certain drawbacks when such an assembly is incorrectly installed or when it becomes necessary to replace one type of valve assembly with another.

It is an object of the present invention to provide a valve body and valve actuator assembly in which the valve actuator assembly is removably connected to the valve body. It is a further object of the invention to provide such an assembly incorporating a mounting arrangement for removably connecting the valve actuator assembly to the valve body and including an arrangement for locating and maintaining the actuator assembly in a predetermined position relative to the valve body. Yet another object of the invention is to provide a valve actuator assembly including an interchangeable drive mechanism which enables the same basic actuator construction to be utilized for providing both normally open and normally closed operation of the valve body. A still further object of the invention is to provide a valve body and actuator construction in which one actuator can be mounted to the valve body for providing operation in one direction and another actuator assembly can be mounted to the valve body for providing operation in another direction. A still further object of the invention is to provide a removable valve actuator arrangement in which an actuator assembly providing operation of the valve body in one direction can be removed and replaced with a different actuator assembly providing operation of the valve body in a different direction. A still further object of the invention is to provide a valve actuator assembly usable with two different types of valve bodies, such as with either a two-way or a three-way valve body.

In accordance with one aspect of the invention, a valve assembly includes a valve body defining an internal passage and including a valve member for controlling flow of fluid through the passage. The valve member is mounted to an operating member, such as a valve stem pivotably mounted to the valve body for providing movement of the valve member. The valve stem includes an axially extending connector portion accessible from the exterior of the valve body. The valve assembly further includes an actuator assembly including a motor having an output and a drive mechanism. A removable connection arrangement is interposed between the valve body and the actuator assembly for providing removable interconnection of the actuator mechanism with the valve body. In this manner, when the actuator assembly is connected to the valve body, the actuator assembly drive mechanism is interconnected with the connector portion of the valve stem for providing movement of the valve stem, and thereby movement of the valve member, in response to operation of the motor. The actuator assembly preferably includes an adaptor plate to which the motor and the drive mechanism are mounted. The removable connection arrangement is preferably interposed between the valve body and the adaptor plate. The removable connection arrangement preferably includes a protrusion provided on the valve body and releasable engagement structure associated with the adaptor plate and with the protrusion. The releasable engagement structure provides manual push-on connection of the actuator assembly to the valve body in a direction substantially parallel to the longitudinal axis of the valve stem, and includes a manually engageable release member for disconnecting the actuator assembly from the valve body and enabling the actuator assembly to be removed from the valve body using a pull-off force in a direction substantially parallel to the longitudinal axis of the valve stem. The connector portion of the valve stem preferably is in the form of an end portion of the valve stem which protrudes axially outwardly from the valve body, and the protrusion provided on the valve body preferably extends in an axial direction substantially parallel to the longitudinal axis of the end portion of the valve stem. The releasable engagement structure is defined by a movable engagement member provided on the adaptor plate, which is movable between an engaged position and a disengaged position. In a preferred form, the releasable engagement structure includes a locking arrangement interposed between the movable engagement member and the protrusion for securing the adaptor plate to the valve body when the movable engagement member is in its engaged position. Movement of the movable engagement member to its disengaged position enables the adaptor plate to be removed from the valve body. The locking arrangement is preferably in the form of a notch formed in the protrusion and engagement structure formed on the movable engagement member. When the movable engagement member is in its engaged position, the engagement structure is received within the notch so as to secure the adaptor plate, and thereby the actuator assembly, to the valve body. In a preferred form, the movable engagement member is formed integrally with the adaptor plate. The movable engagement member may be in the form of an arm defining a pair of ends and engageable with the protrusion when in its engaged position. A first end of the arm member is formed integrally with the adaptor plate and a second end of the arm member is movable in response to engagement by a user to place the movable arm member in its disengaged position. The integral formation of the first end of the arm member with the adaptor plate functions to bias the movable engagement member toward its engaged position.

In accordance with another aspect of the invention, a mounting arrangement for mounting a valve actuator assembly to a valve body includes a latching member provided on the valve body and latch structure provided on the actuator assembly and engageable with the latching member for securing the actuator assembly to the valve body. Mating engagement structure is provided on both the actuator assembly and the valve body for locating and maintaining the actuator assembly in a predetermined position relative to the valve body. The mating engagement structure is preferably in the form of a pair of spaced protrusions formed on the valve body and a pair of mating recesses provided on the actuator assembly, and each recess is received within one of the protrusions. The latching member provided on the valve body is preferably in the form of an upstanding member separate from the pair of spaced protrusions. In a preferred form, the latching member is laterally offset in a first direction from a line extending between the pair of spaced protrusions, and the connector portion of the valve stem is laterally offset in a second direction, opposite the first direction, from a line extending between the pair of spaced protrusions. The actuator assembly includes an adaptor plate to which the motor and drive mechanism are mounted, and the latch structure is provided on the adaptor plate. The latch structure is preferably in the form of a latch arm formed integrally with the adaptor plate and movable between an engaged position and a disengaged position. In its engaged position, the latch arm is engaged with the upstanding latching member for securing the actuator assembly to the valve body. In its disengaged position, the latch arm is disengaged from the upstanding latching member for enabling the actuator assembly to be removed from the valve body.

Another aspect of the invention involves a method of controlling the direction of operation of a valve member in a valve assembly incorporating an actuator assembly having a motor with an output drive gear. The method contemplates providing an adaptor plate for connection to the valve body and providing first and second drive gears, each of which is adapted to be pivotably mounted to the adaptor plate. The first drive gear has gear teeth facing in a first direction, and the second drive gear has gear teeth facing in a second direction opposite the first direction. One of the first and second drive gears is selected and pivotably mounted to the adaptor plate such that the selected drive gear is interconnected with the valve stem. The method further contemplates mounting the motor to the adaptor plate such that the output drive gear of the motor engages the gear teeth of the selected drive gear. The gear teeth of the first drive gear engage one side of the output drive gear for providing movement of the first drive gear in a first direction in response to operation of the motor. The gear teeth of the second drive gear engage a side of the output drive gear opposite the side of the output drive gear engaged by the first drive gear, for providing movement of the second drive gear in a second direction opposite the first direction in response to operation of the motor. With this arrangement, either the first drive gear or the second drive gear is utilized to provide operation of the actuator assembly in either a first direction or a second direction. The valve member of the valve body is mounted for movement between an open position for providing flow of fluid through the internal passage of the valve body, and a closed position for preventing flow of fluid through the internal passage. The method thus provides either normally open or normally closed operation of the valve, depending upon which of the drive gears is selected and installed in the actuator assembly. In a preferred form, a spring is preferably interconnected with the selected drive gear for biasing the drive gear in a direction providing either the normally open position or the normally closed position of the valve member, depending upon which drive gear is selected. The step of interconnecting a spring with the drive gear may be carried out by mounting a torsion spring to gear mounting structure associated with the adaptor plate and to which the selected gear is pivotably mounted, such that the torsion spring is interconnected with the selected gear. Alternatively, the step of interconnecting a spring with the selected drive gear may be carried out by connecting an extension spring between the selected drive gear and the adaptor plate. The first drive gear is preferably in the form of a first sector gear which includes a pivot axis and a series of arcuate outwardly facing teeth spaced from the pivot axis. The second drive gear is preferably in the form of a second sector gear including a pivot axis and a series of arcuate inwardly facing teeth spaced from the pivot axis. The step of pivotably mounting a selected one of the drive gears to the adaptor plate is carried out by providing mounting structure on the adaptor plate defining a passage within which the valve stem is received, and pivotably mounting the selected drive gear to the mounting structure such that the selected drive gear is drivingly engaged with the valve stem. In a preferred form, the step of removably connecting the adaptor plate to the valve body is carried out such that the actuator assembly can be engaged with and disengaged from the valve body, such as by providing engagement structure on an arm provided on the adaptor plate, with the arm being mounted to the adaptor plate for movement between an engaged position and a disengaged position.

Another aspect of the invention involves a method of controlling the direction of operation of a valve. The method contemplates the steps of providing first and second actuator assemblies, each of which has a motor having an output. The first actuator assembly has a first drive member engaged with the motor output, such that operation of the motor functions to move the first drive member in a first direction. The second actuator assembly includes a second drive member engaged with the motor output, such that operation of the motor functions to move the second drive member in a second direction opposite the first direction. The method further involves connecting either the first actuator assembly to the valve body such that the first drive member is interconnected with the valve stem, or connecting the second actuator assembly to the valve body such that the second drive member is interconnected with the valve stem. The valve member is movable between open and closed positions, and the method contemplates providing either normally open or normally closed operation of the valve. The method further contemplates connecting a spring with the first drive member of the first actuator assembly for biasing the first drive member in the second direction opposite the first direction, and connecting a spring with the second drive member of the second actuator assembly for biasing the second drive member in the first direction. When the first drive member is interconnected with the valve stem, the spring of the first actuator assembly functions to bias the valve member toward its normally closed position and operation of the motor functions to move the valve member toward its open position against the biasing force of the spring. When the second actuator assembly is connected to the valve body, the spring of the second actuator assembly functions to bias the valve member toward its normally open position and operation of the motor functions to move the valve member toward its closed position against the biasing force of the spring. The first drive member of the first actuator assembly is in the form of a gear having a series of gear teeth facing in a first direction. The second drive member of the second actuator assembly is preferably in the form of a gear having a series of gear teeth facing in a second direction opposite the first direction. The step of providing a first actuator assembly and the step of providing a second actuator assembly are carried out by providing an adaptor plate having the same construction for each of the first and second actuator assemblies and providing an identical motor for each of the first and second actuator assemblies.

A still further aspect of the invention contemplates an improvement in an actuator assembly for use with a valve body having a valve member and a valve stem. The actuator assembly includes a motor having a drive member engaged with the valve stem and a spring for biasing the valve member, through the drive member, in a first direction so as to normally position the valve member in either its open position or its closed position. The improvement contemplates providing a removable connection arrangement between the actuator assembly and the valve body and removing the actuator assembly from the valve body. The improvement further contemplates connecting a second actuator assembly to the valve body, with the second actuator assembly including a motor having a second drive member engaged with the valve stem and a second spring for biasing the valve member, through the second drive member, in a second direction opposite the first direction to normally position the valve member in either its closed position or its open position opposite the position provided by the drive member of the first-mentioned actuator assembly. The step of providing a removable connection arrangement between the actuator assembly and the valve body may be carried out substantially in accordance with the foregoing summary. Further, the step of connecting the second actuator assembly to the valve body may be carried out via movable engagement structure on the second actuator assembly having a construction substantially identical to the movable engagement structure on the first-mentioned actuator assembly. In a preferred form, each of the first-mentioned and second actuator assemblies includes an adaptor plate to which the motor of each actuator assembly is mounted, with the adaptor plate of the first-mentioned actuator assembly being substantially identical in construction to the adaptor plate of the second actuator assembly.

Yet another aspect of the invention contemplates a valve actuator for use with at least two different valve bodies, a first one of which includes a first valve member mounted to a first valve stem and a second one of which includes a second valve member mounted to a second valve stem. Each valve body defines external engagement structure. The first valve stem is movable through a first range of operating positions for moving the first valve member between first and second positions. Similarly, the second valve stem is movable through a second range of operating positions, different from the first range of operating positions, for moving the second valve member between first and second positions. The valve actuator includes engagement structure which is engageable with both the external engagement structure of the first valve body and the external engagement structure of the second valve body for securing the valve actuator to either the first or second valve body. The valve actuator further includes a motor having an output, and a drive mechanism drivingly engaged with the motor output and with the valve stem of either the first or second valve body when the valve actuator is mounted thereto. The drive mechanism functions to move the first valve stem through its first range of operating positions when the valve actuator is mounted to the first valve body, and functions to move the second valve stem through the second range of operating positions when the valve actuator is mounted to the second valve body. In one form, the first valve body may be a two-way valve body having a pair of internal openings and the second valve body may be a three-way valve body having three internal openings. In a two-way valve body, the first valve member is movable between a closed position in which the first valve member is located over one of the internal openings for preventing flow of fluid through the valve body, and an open position establishing communication between the pair of internal openings to allow flow of fluid through the valve body. In a three-way valve body, the second valve member is movable between a first position in which the second valve member is located over a first one of the internal openings to allow flow of fluid between the other two internal openings, and a second position in which the second valve member is located over a second one of the internal openings to allow flow of fluid between the other two internal openings. The valve actuator includes a stop arrangement for stopping movement of the first valve member when the valve actuator is mounted to the two-way valve body when the first valve member attains a predetermined open position. When the valve actuator is mounted to the three-way valve body, engagement of the second valve member with the first and second internal openings functions to limit movement of the second valve member such that the stop arrangement of the valve actuator is not utilized. In a preferred form, the valve actuator includes a removable connection arrangement as summarized above, and the mounting arrangement for mounting the valve actuator to each valve body is also preferably as summarized above.

As can be appreciated, the invention contemplates several improvements in a valve body and valve actuator system. Preferably, the various aspects of the invention are utilized in combination to significantly enhance and improve manufacture, installation and operation of a valve body and valve actuator system. However, it is understood that the various aspects of the invention could be used individually or in subcombinations as desired.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 4 is an exploded isometric view with a portion of the valve body broken away to show its internal components and with certain of the components of the valve actuator removed;

FIG. 5 is a top plan view of the components of the valve actuator of FIG. 4, with reference to line 5—5 of FIG. 6, showing the position of the valve actuator components when the valve member of the valve body is in its closed position;

FIG. 6 is a section view taken along line 6—6 of FIG. 5;

FIG. 14 is a section view taken along line 14—14 of FIG. 6;

FIG. 15 is a partial section view taken along line 15—15 of FIG. 5, showing the adaptor plate latch arm in its engaged position for securing the valve actuator and valve body together as shown in FIG. 1;

FIG. 15a is a partial section view showing a portion of the adaptor plate and latch arm as the valve actuator is moved into engagement with the valve body;

FIG. 16 is a partial section view showing the latch arm moved to its disengaged position;

FIG. 17 is a view similar to FIG. 15 showing removal of the valve actuator from the valve body, as in FIG. 2;

DETAILED DESCRIPTION OF THE INVENTION

Figure 1:
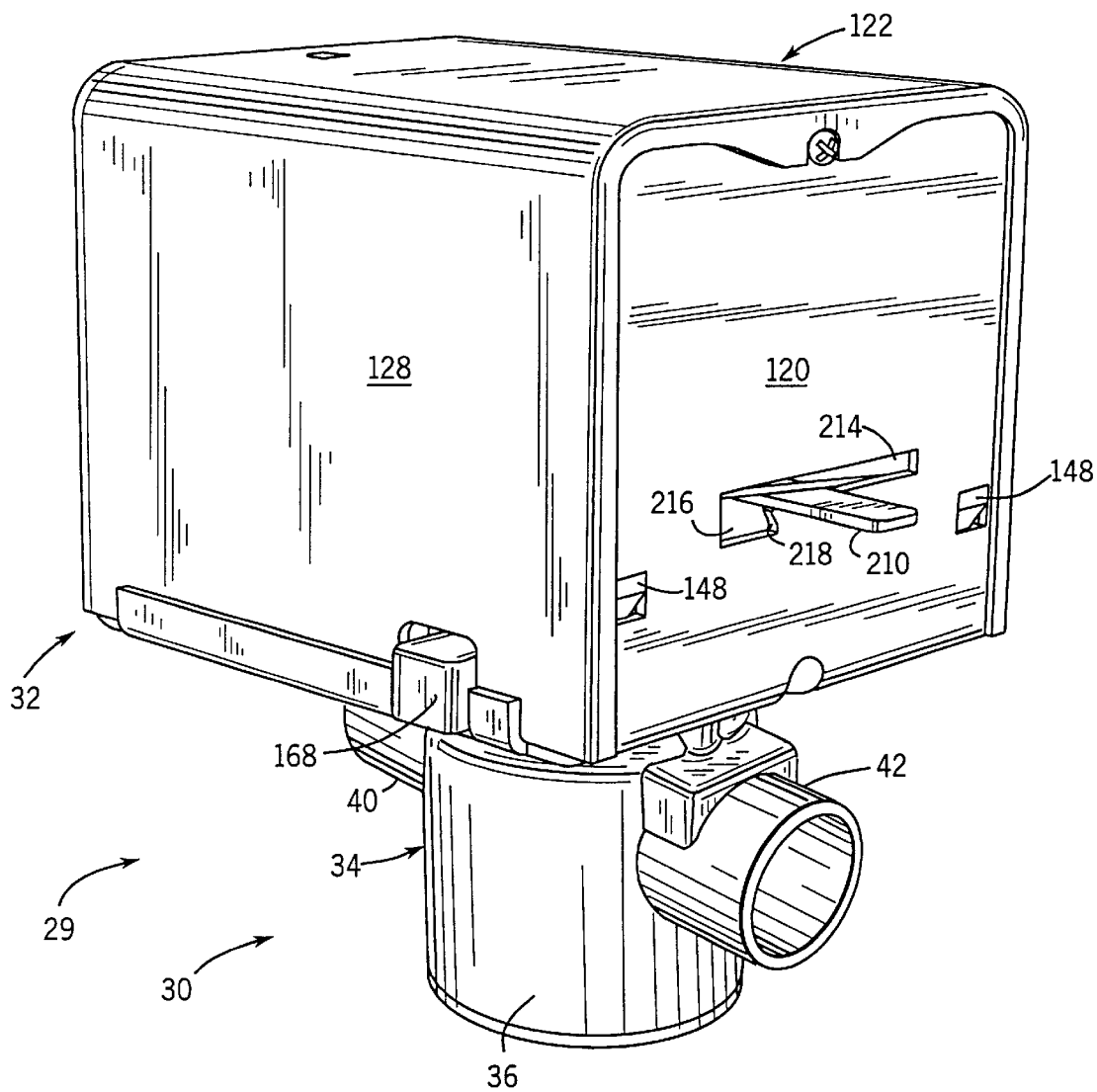
FIG. 1 is an isometric view illustrating a valve actuator and a valve body constructed according to the invention.
Figure 2:
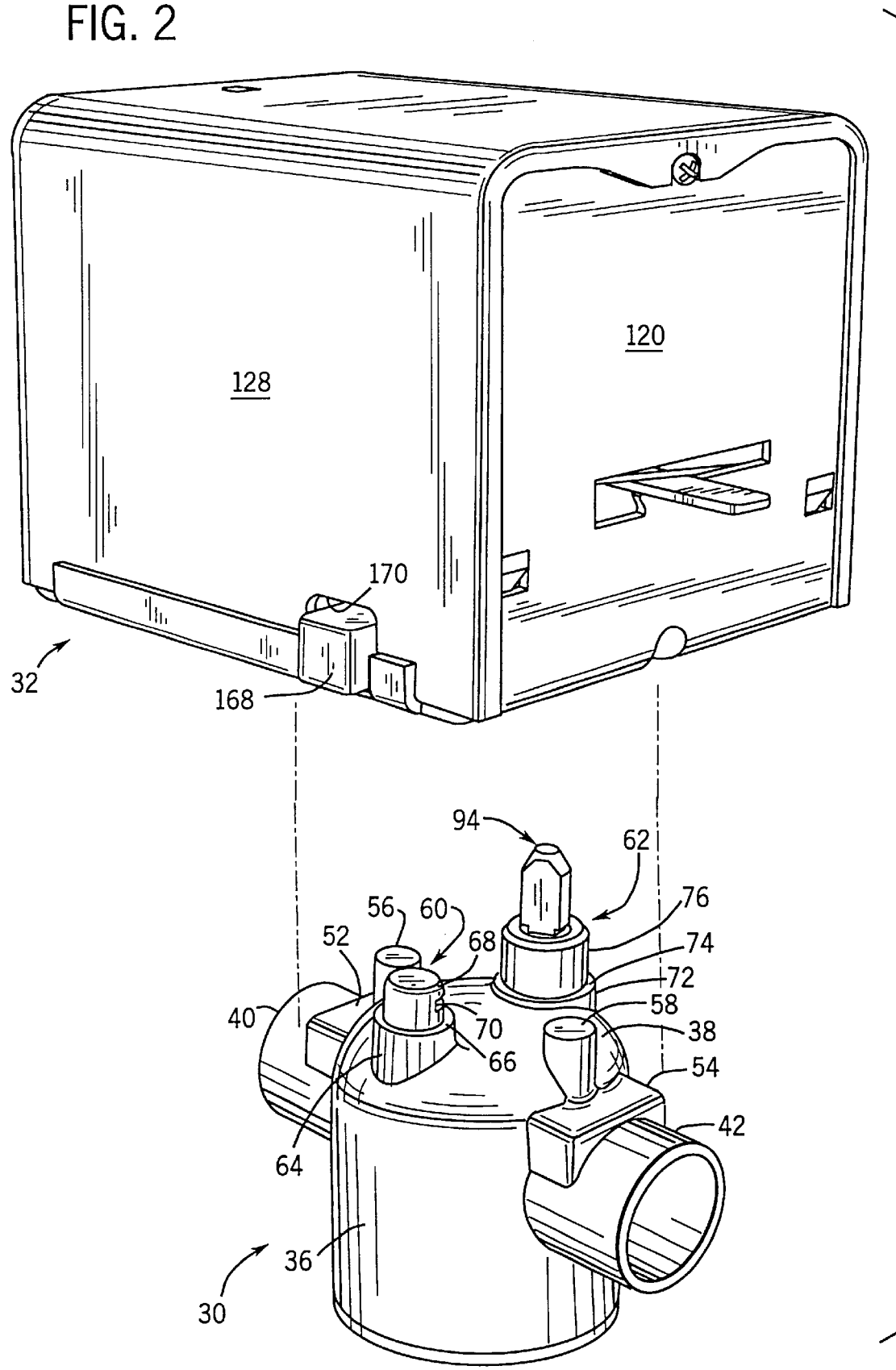
FIG. 2 is an exploded isometric view of the valve actuator and valve body of FIG. 1.

FIG. 1 illustrates a valve assembly 29 including a valve body 30 and a valve actuator assembly 32. Valve body 30 includes a central body portion 34 defined by a peripheral sidewall 36 and a domed upper wall 38 (FIG. 2). A pair of nipples 40, 42 extend from sidewall 36. Nipples 40, 42 are adapted to be plumbed into a fluid flow line, such as a line used in a water-operated heating system or in any other application requiring regulation of fluid flow in the line.

As shown in FIG. 4, nipple 40 defines an outlet passage 44 and nipple 42 defines an inlet passage 46 having an inner restricted portion 47. Passages 44 and 46 communicate with each other through a cavity 48 formed in central valve body portion 34, which is defined by sidewall 36 and domed upper wall 38 in combination with a plug 50 which closes the lower end of central body portion 34 and is secured to the lower extent of sidewall 36.

As shown in FIGS. 2 and 4, a block 52 is formed between valve body upper wall 38 and the upper portion of nipple 40 at the intersection of nipple 40 with valve body sidewall 36. Similarly, a block 54 is formed between nipple 42 and valve body upper wall 38 at the intersection of nipple 42 with valve body sidewall 36. A boss 56 extends upwardly from a flat upper surface defined by block 52, and a boss 58 extends upwardly from a flat upper surface defined by block 54. Blocks 52 and 54 and bosses 56 and 58 are substantially identical in construction and are symmetrical about longitudinal and transverse horizontal axes and the vertical axis of valve body 30. Valve body 30 further defines upstanding latching boss or post structure shown generally at 60 (FIG. 2) and a valve stem boss or post structure shown generally at 62.

Latching post structure 60 includes an upstanding base 64 defining an upwardly facing shoulder 66. A post 68 extends upwardly from shoulder 66, and an inwardly facing notch 70 is formed in post 68. Latching post structure 60 is laterally offset from a longitudinal axis defined by valve body 30 which is coincident with the longitudinal axes of nipples 40 and 42.

Stem post structure 62 includes a base 72 extending upwardly from upper wall 38 and terminating in a shoulder 74. A cylindrical collar 76 extends upwardly from shoulder 74. Collar 76 defines an open upper end and a vertical passage 78 (FIG. 6) extends from the open upper end of collar 76 to cavity 48 defined by valve body 30.

Referring to FIGS. 4 and 6, a valve member 80 is disposed within cavity 48. Valve member 80 is connected to an operating member such as a valve stem 82 which is pivotably received within passage 78. Valve member 80 defines a first sealing surface 84, a second sealing surface 86, and an outer side surface 88 extending therebetween. A tab 90 extends from side surface 88 and is received within a slot formed in valve stem 82. A pin 92 extends through an opening formed in tab 90 and through aligned passages formed in valve stem 82 on opposite sides of the slot within which tab 90 is received, for securely connecting valve member 80 to the lower end of valve stem 82.

The upper end of valve stem 82 defines a connector portion 94 (FIG. 4). A notch 96 is formed at the lower end of connector portion 94 and receives a ring (not shown) for fixing valve stem 82 in a predetermined axial position relative to stem collar 76 and thereby valve body portion 34. Connector portion 94 defines a pair of oppositely facing parallel flat side surfaces 100, 102 and a conical upper end 104.

Figure 7:
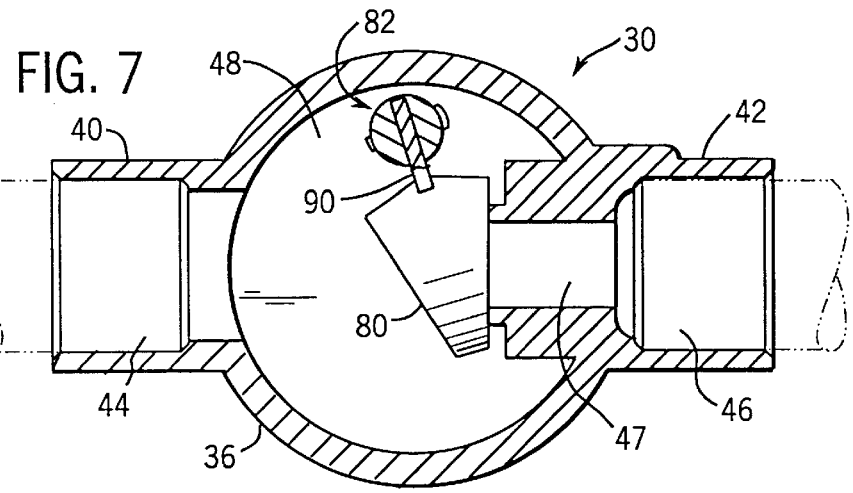
FIG. 7 is a section view taken along line 7—7 of FIG. 6, showing the valve member in its closed position.
Figure 8:
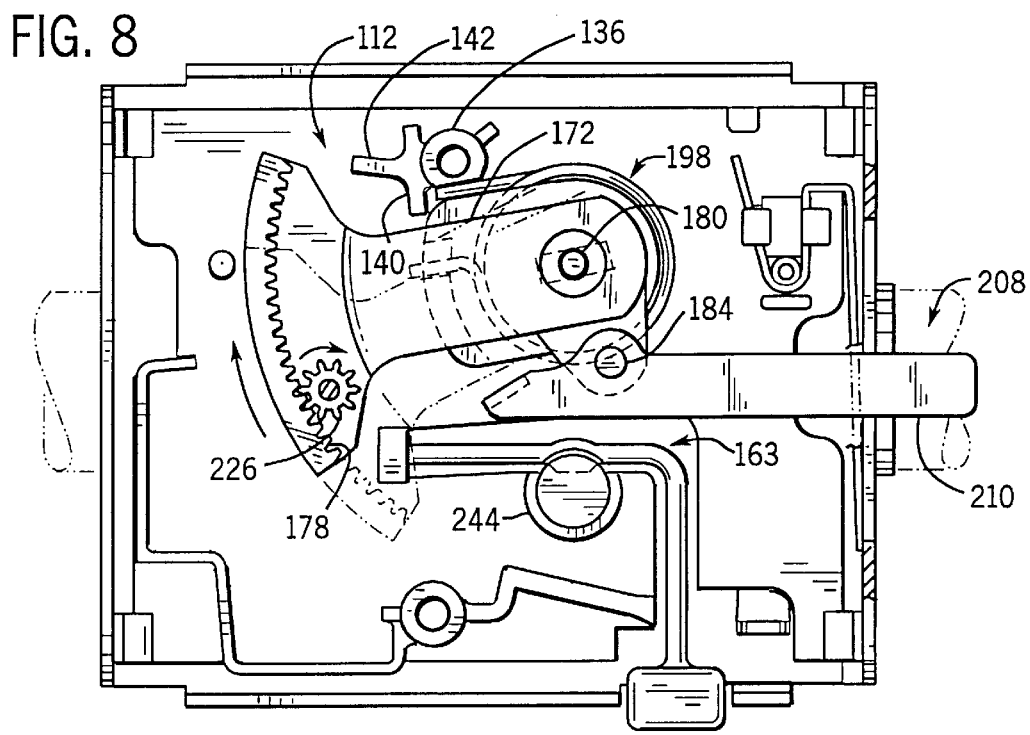
FIG. 8 is a view similar to FIG. 5, showing movement of the valve components so as to move the valve member away from its closed position of FIG. 7.
Figure 9:
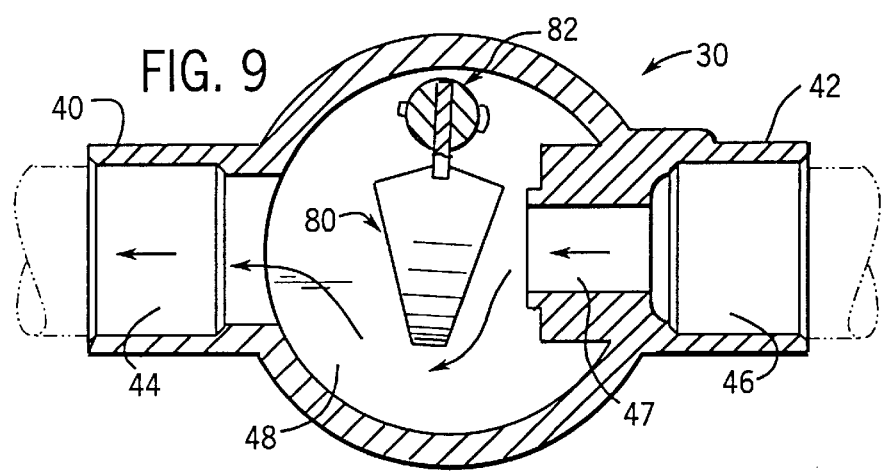
FIG. 9 is a view similar to FIG. 7 showing movement of the valve member to its open position upon movement of the valve actuator components to the position as shown in FIG. 8.

The pivotable mounting of valve stem 82 to valve body 34 provides movement of valve member 80 between a closed position as shown in FIGS. 4, 6 and 7 and an open position as shown in FIG. 9. In its closed position, valve member 80 functions to cut off communication between valve cavity 48 and nipple passage 46 to prevent flow of fluid therebetween.

Figure 3:
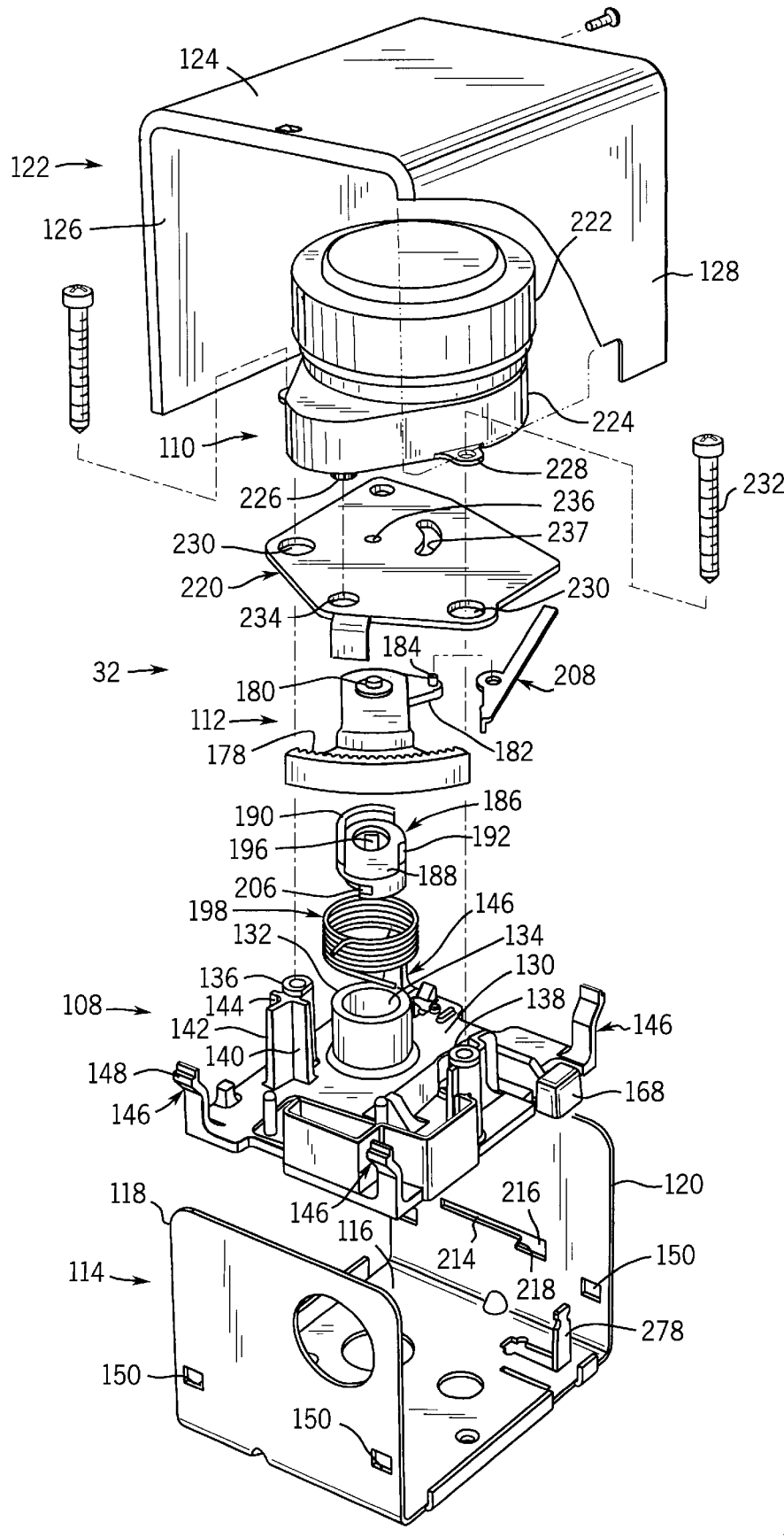
FIG. 3 is an exploded isometric view showing the internal components of the valve actuator of FIG. 2 for providing normally closed operation of the valve body.

Referring to FIG. 3, valve actuator assembly 32 generally includes an adaptor plate 108, a motor 110 and a drive gear 112. In a manner to be explained, drive gear 112 is mounted to adaptor plate 108 for pivoting movement, and motor 110 is likewise mounted to adaptor plate 108 and is drivingly engaged with drive gear 112, which in turn is engaged with valve stem 82 for providing movement of valve member 80 between its open and closed positions.

Actuator assembly 32 includes a housing enclosure having a lower section 114 including a bottom wall 116 and a pair of sidewalls 118, 120 extending upwardly from the opposite ends of bottom wall 116. The housing enclosure further includes an upper section 122 defining an upper wall 124 and a pair of sidewalls 126, 128 extending downwardly from opposite ends of upper wall 124. In this manner, lower section 114 defines an upwardly open U-shape and upper section 122 defines a downwardly open U-shape which fit together such that sidewalls 118, 120 of lower section 114 are received within the space between sidewalls 126, 128 of upper section 122. Similarly, sidewalls 126, 128 of upper section 122 are received within the space between sidewalls 118, 120 of lower section 114, to define a housing having an interior for receiving the operating components of actuator assembly 32.

Adaptor plate 108 defines a lower wall or base plate 130. A cylindrical member 132 extends upwardly from base plate 130, and defines an internal passage 134 which opens upwardly and which extends through base plate 130 and opens downwardly. Adaptor plate 108 further includes a pair of mounting bosses 136, 138, each of which includes a central vertical aperture. Mounting boss 136 further defines a series of upstanding ribs 140, 142 and 144, the function of which will later be explained.

A series of spring clips 146 are formed at the corners of base plate 130, extending upwardly therefrom. Each spring clip 146 defines a tab 148 which is received within an opening 150 formed in one of sidewalls 118, 120 of housing lower section 114. In this manner, adaptor plate 108 is mounted to housing lower section 114 in a snap-on manner by inserting adaptor plate 108 downwardly between sidewalls 118, 120 of housing lower section 114 such that spring clips 146 deflect inwardly and tabs 148 ride along the inner facing surfaces of sidewalls 118, 120 until tabs 148 reach openings 150. Spring clips 146 then move outwardly so as to force tabs 148 into openings 150, to removably connect adaptor plate 108 to housing lower section 114. In this position, the bottom surface of adaptor plate 108 engages the upper surface of lower wall 116 of housing lower section 114.

Referring to FIGS. 4 and 5, base plate 130 of adaptor plate 108 is formed with a slot defining an inner section 160 and an outer section 162 formed at a right angle to inner section 160. An engagement member is formed integrally with base plate 130, and is in the form of a latch arm 163 having an inner section 164 and an outer section 166 which extends at a right angle relative to inner section 164. An engagement button 168 is formed at the outer end of latch arm outer section 166. Engagement button 168 extends outwardly past the adjacent side edge of adaptor plate 108, and extends through an opening 170 (FIG. 2) formed in sidewall 128 of housing upper section 122.

The inner end of latch arm inner section 164 is formed integrally with base plate 130, such that latch arm 163 is an integral part of adaptor plate 108. Latch arm 163 is movable between an engaged position as shown in FIGS. 5, 8, 10 and 15 and a disengaged position as shown in FIGS. 16 and 17 and which will later be explained. The integral formation of latch arm inner section 164 with adaptor plate 108 functions to bias latch arm 163 toward its engaged position of FIGS. 5, 8, 10 and 15.

Referring to FIGS. 3, 5 and 6, drive gear 112 is in the form of a sector gear defining an arm 172 interconnected with an outer section 174 having a channel 176 formed therein. A series of inwardly facing gear teeth 178 are formed in outer section 174 on a wall defining channel 176, and gear teeth 178 are arranged in an arcuate configuration having a center coincident with a pivot axis of drive gear 112 defined by a stud 180 mounted to the inner end of arm 172. Stud 180 is molded into the inner end of drive gear arm 172. Drive gear 112 further includes a triangular tab 182 extending outwardly from its inner end, and an upstanding pin 184 is formed at the outer end of tab 182.

A gear bearing 186 is interposed between drive gear arm 172 and cylindrical member 132 which extends upwardly from base plate 130. Gear bearing 186 defines an upper surface 188 which receives a downwardly facing surface defined by drive gear arm 172. A J-shaped wall 190 extends upwardly from the side edge of bearing 186 above upper surface 188, and a short wall section 192 extends upwardly from the opposite side of gear bearing 186. With this construction, drive gear arm 172 is nested within the space defined between walls 190 and 192, such that tab 182 extends outwardly through the space between walls 192 and 190, as does drive gear outer section 174.

As shown in FIG. 6, gear bearing 186 includes a downwardly extending mounting member 194 having a vertical slot 196 formed therein. Mounting member 194 has a circular cross-section slightly smaller than the diameter of passage 134 defined by upstanding cylindrical member 132. In this manner, mounting member 194 is received within passage 134 so as to pivotably mount gear bearing 186 to cylindrical member 132 and thereby to adaptor plate 108. This in turn functions to pivotably mount drive gear 112 to adaptor plate 108.

A torsion spring 198 surrounds cylindrical member 132, defining an internal diameter slightly larger than the external diameter of cylindrical member 132. As shown in FIG. 5, torsion spring 198 defines a lower end extension 200 which engages a flat surface 202 defined by mounting boss 136. Torsion spring 198 further defines an upper end extension 204 which is received within a slot 206 defined by gear bearing 186. Torsion spring 198 functions to bias drive gear 112 in a counterclockwise direction, for reasons which will later be explained.

Referring to FIG. 5, a manually operated lever 208 includes a handle portion 210 and an opening formed in its inner end for receiving pin 184. Lever 208 further includes an engagement surface 212. Lever 208 is pivotable about pin 184, and handle portion 210 of lever 208 extends through a slot 214 formed in sidewall 120 of housing lower section 114. Slot 214 includes an enlarged end 216 which defines an angled engagement surface 218.

A bearing plate 220 overlies drive gear 112, and motor assembly 110 is mounted to bearing plate 220. Motor assembly 110 generally includes a motor 222 having a motor output which is drivingly interconnected with a drive gear mechanism 224 including an output drive gear 226. Drive gear mechanism 224 includes a series of mounting tabs such as shown at 228, and openings 230 are formed in bearing plate 220 in alignment with apertures formed in mounting tabs 228. With this arrangement, motor assembly 110 and bearing plate 220 are mounted to adaptor plate 108 by positioning tabs 228 and bearing plate openings 230 over mounting bosses 136, 138 and utilizing threaded fasteners 232 to extend into the central vertical aperture in each of mounting bosses 136, 138 for securing motor assembly 110 and bearing plate 220 to base plate 114 through mounting bosses 136, 138. Bearing plate 220 further includes an opening 234 through which output drive gear 226 extends, and an opening 236 for receiving stud 180 to pivotably mount drive gear 112 to bearing plate 220. An arcuate slot 237 is formed in bearing plate 220 for receiving the upper end of pin 184. In this manner, drive gear 112 and gear bearing 186 are sandwiched between bearing plate 220 and cylindrical member 132, so as to securely and pivotably mount gear bearing 186 and drive gear 112 to adaptor plate 108 and to motor assembly 110. Lever 208 is sandwiched between the lower surface of bearing plate 220 and the upper surface of tab 182 so as to assemble lever 208 to drive gear 112.

As shown in FIG. 5, drive gear 226 of motor assembly 110 and gear teeth 178 of drive gear 112 are arranged and configured such that the teeth of motor output drive gear 226 engage the teeth 178 of drive gear 112 when motor assembly 110 and drive gear 112 are assembled as described. With this arrangement, operation of motor assembly 110 functions to impart pivoting movement to drive gear 112 via engagement of motor output drive gear 226 with drive gear teeth 178.

Motor 222 is preferably a unidirectional motor, and operation of motor 222 to rotate motor output drive gear 226 in a clockwise direction functions to move drive gear 112 in a clockwise direction against the biasing force exerted by torsion spring 198.

The components of valve assembly 30 as illustrated in FIGS. 1–11 and as described above provide normally closed operation of valve assembly 30. That is, when motor 222 is not being operated, spring 198 functions to move drive gear 112 in a counter-clockwise direction, which movement is transferred through gear bearing 186 and valve stem connector portion 94 to valve stem 82 and thereby to valve member 80 for seating sealing surface 84 of valve member 80 against a peripheral seating surface, shown at 239, defined by valve body 30 at the inner end of restricted passage portion 47. When it is desired to allow fluid to flow through valve body 34, motor 222 is actuated so as to impart clockwise rotation to motor output drive gear 226 and to move drive gear 112 in a clockwise direction, as described previously and as shown in FIG. 8, for moving valve member 80 to its open position as shown in FIG. 9 in which sealing surface 84 of valve member 80 is moved away from valve seating surface 239 to establish communication between nipple passages 44 and 46.

Pin 184 moves within bearing plate slot 237 as drive gear 112 is pivoted between its open and closed positions.

Figure 10:
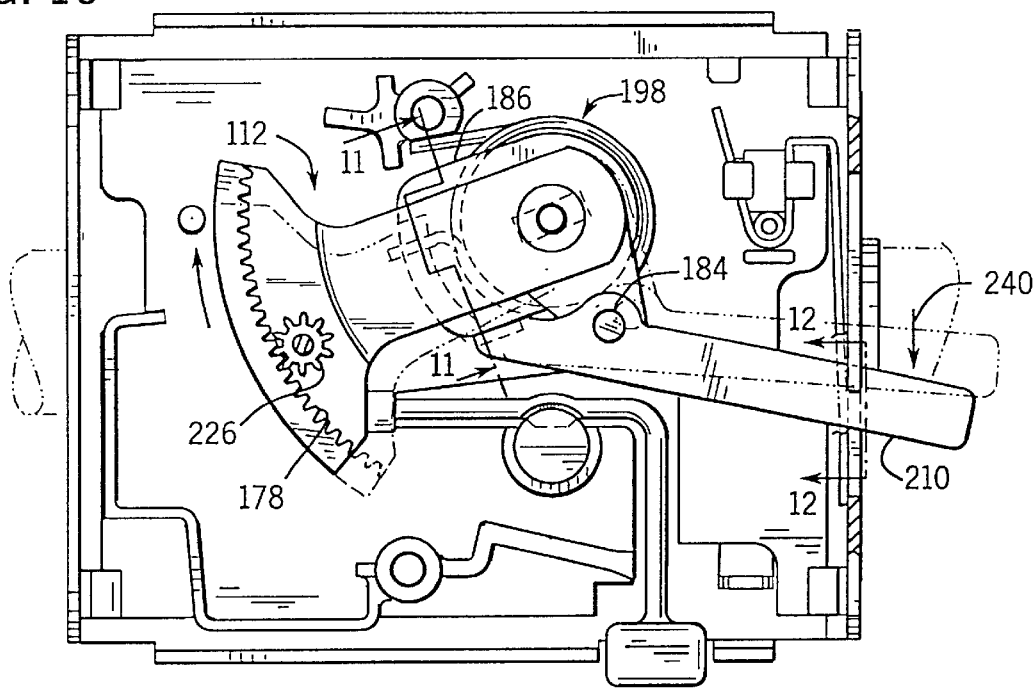
FIG. 10 is a view similar to FIGS. 5 and 8, showing the valve actuator components when manually locked in an open position.
Figure 11:
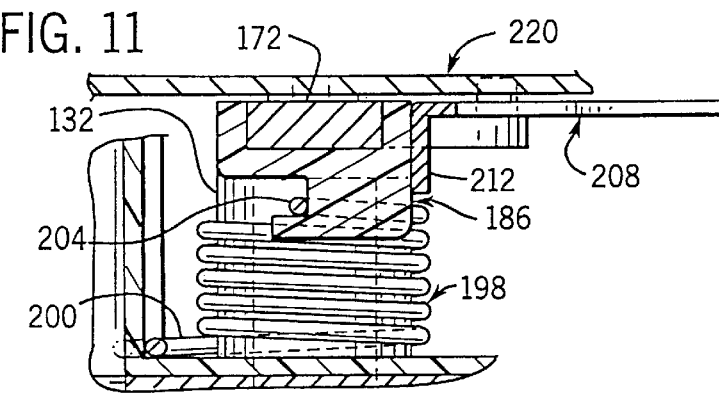
FIG. 11 is a section view taken along line 11—11 of FIG. 10.
Figure 12:
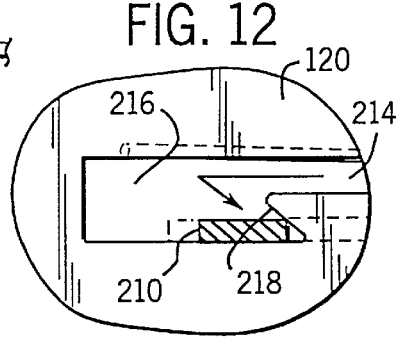
FIG. 12 is a section view taken along line 12—12 of FIG. 10.
Figure 13:
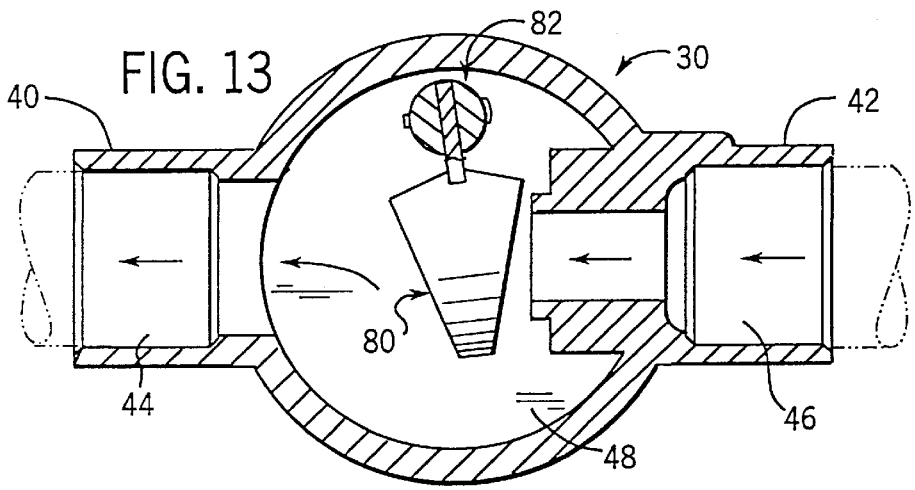
FIG. 13 is a view similar to FIGS. 7 and 9 showing the position of the valve member when the components of the valve actuator are in their FIG. 10 position.

In the event power to motor 222 is cut off and it is desired to open valve assembly 30, a user manually engages handle portion 210 of lever 208 and moves handle portion 210 in a direction as shown at arrow 240 (FIG. 10). This movement of handle portion 210 functions to pivot lever 208 about pin 184 to bring engagement surface 212 of lever 208 into engagement with gear bearing 186, so as to pivot drive gear 112 in a clockwise direction as shown in FIG. 10. If desired, handle portion 210 can be moved into enlarged end 216 of slot 214 and into engagement with engagement surface 218 for maintaining valve member 80 in an open position as shown in FIG. 13.

As noted previously, FIG. 8 illustrates drive gear 112 being rotated in a clockwise direction toward a position in which valve member 80 is placed in its fully open position of FIG. 9. When drive gear 112 is fully rotated clockwise to position valve member 80 in its open position of FIG. 9, the edge of drive gear arm section 172 engages the end of rib 140 provided on boss 136. Rib 140 thus provides a mechanical stop for drive gear 112 to limit its rotation in response to operation of motor 222.

As shown in FIG. 15, latch arm 163 includes an engagement tab 242 which is received within notch 70 formed in latching post 68 provided on valve body 30, which functions to connect valve actuator assembly 32 to valve body 30. Base plate 130 includes an arcuate upstanding wall 244 which partially surrounds and engages latching post 68, such that wall 244 provides stability when latch arm 163 is in its engaged position of FIG. 15. In addition, stem post collar 76 is received within passage 134 defined by base plate cylindrical member 132. This combination functions to fix actuator assembly 32 relative to valve body 30 in a predetermined position. When actuator assembly 32 and valve body 30 are assembled in this manner, the lower end of base plate cylindrical member 132 engages stem post shoulder 74, and the lower surface of wall 244 engages latching post shoulder 66. In addition the flat upper surfaces of bosses 56, 58 engage the lower surface of housing lower section bottom wall 116. This provides a four-point support of valve actuator 32 on valve body 30 to prevent angular movement therebetween.

Valve actuator assembly 32 can be removed from valve body 30 for replacement or service, or for any other reason. To remove valve actuator assembly 32, the user manually engages button 168 formed at the end of outer latch arm section 166 and exerts an axial inward force on latch arm 163 in the direction of an arrow 246 as shown in FIG. 16. This functions to move latch arm 163 to its disengaged position in which tab 242 is moved out of latching post notch 70 such that the end of tab 242 clears the structure of latching post 68 defining notch 70. As shown in FIG. 5, inner slot section 160 is formed so as to accommodate the lateral angular movement of inner latch arm section 164 when latch arm 163 is moved to its disengaged position as shown and described. This movement of latch arm 163 is against the bias of latch arm 163 toward its engaged position, which is provided by the integral formation of latch arm 163 with base plate 130.

When latch arm 163 is in its disengaged position of FIG. 16, the user exerts an upward force on valve actuator assembly 32, as shown in FIG. 17, to move valve actuator assembly 32 away from valve body 30. This upward movement of valve actuator assembly 32 results in withdrawal of valve stem connector portion 94 from gear bearing slot 196, as shown in FIG. 17. The user then releases engagement of latch arm button 168, which then returns to its engaged position.

The removability of valve actuator assembly 32 as described enables valve actuator assembly to be replaced or repaired without having to remove valve body 30 from the line into which it is plumbed. Further, valve actuator assembly 32 can be removed from valve body 30 at any time, such as during manufacture or testing, if it is determined that valve actuator assembly 32 or valve body 30 requires replacement for any reason. To mount another valve actuator assembly 32 to valve body 30 or to mount another valve body 30 to valve actuator 32, the user simply reverses the steps of FIGS. 15–17.

Valve actuator assembly 32 as illustrated in FIGS. 1–17 provides normally closed operation of valve body 30 such that valve member 80 is normally in its closed position of FIG. 7 when motor 222 is not operated, under the influence of torsion spring 198. FIGS. 18–23 illustrate a valve actuator assembly 32' which can be used with the same valve body 30 for providing normally open operation.

Figure 18:
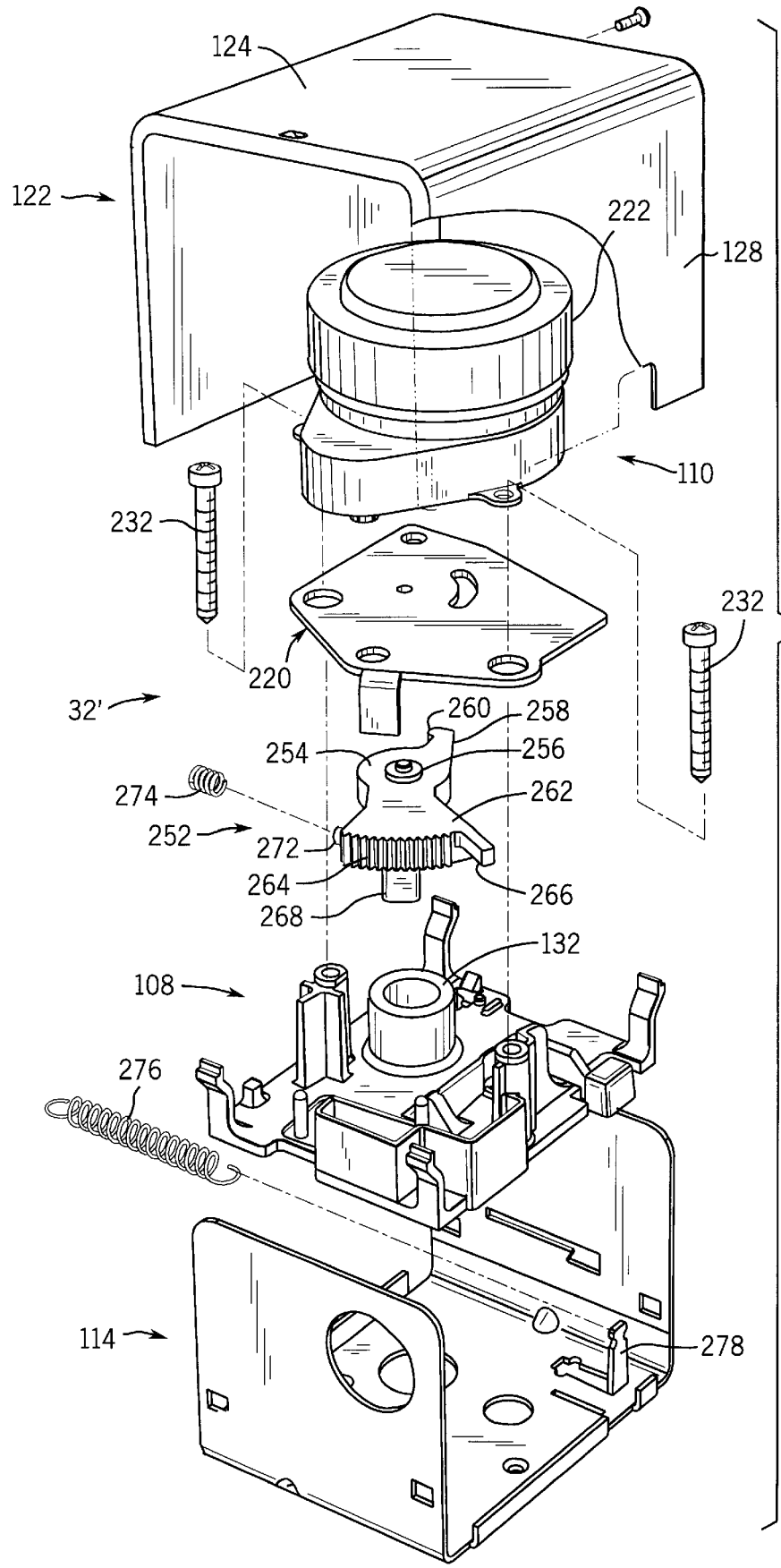
FIG. 18 is a view similar to FIG. 3 showing components of an actuator for providing normally open operation of the valve body.
Figure 19:
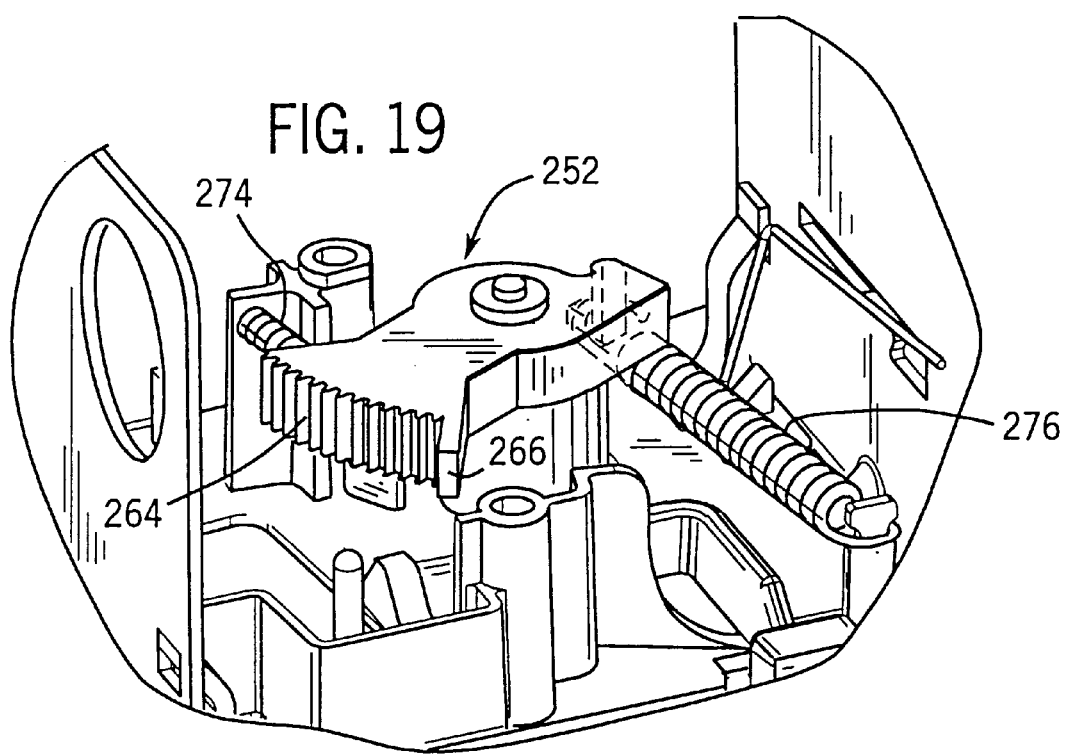
FIG. 19 is a partial isometric view, similar to FIG. 4, showing the components of the valve actuator of FIG. 18.

FIG. 18 illustrates the components of normally open valve actuator assembly 32', the majority of which are identical to the components of normally closed valve actuator assembly 32, and like reference characters will be used. Actuator assembly 32' includes adaptor plate 108, lower housing section 114, upper housing section 122, motor assembly 110, bearing plate 220 and fasteners 232, all having the same construction as shown and described previously.

Valve actuator assembly 32' employs a drive gear 252 in place of drive gear 112 shown and described with respect to valve actuator assembly 32. Drive gear 252 is in the form of a sector gear defining a generally circular base 254 to which a stud 256 is mounted. Stud 256 has the same construction and operation of stud 180 shown and described with respect to valve actuator assembly 32, and extends upwardly along the vertical pivot axis of drive gear 252. Base 254 further includes a rearwardly extending arm 258 having a finger 260 at its rearward end.

Drive gear 252 includes a forward section 262 extending forwardly from base 254. Forward section 262 terminates in a series of outwardly facing gear teeth 264 arranged in an arcuate configuration, the center of which is coincident with the pivot axis defined by stud 256. A stop arm 266 extends from the forward end of forward section 262, extending outwardly of gear teeth 264.

Drive gear 252 further includes a downwardly extending mounting member 268 extending from the bottom surface of base 254 along a longitudinal axis coincident with the pivot axis defined by stud 256. Mounting member 268 includes a slot 270 (FIG. 22) extending upwardly from its lower end, which is sized and shaped so as to receive valve stem connector portion 94. Mounting member 268 has a cross-section sized and shaped so as to enable mounting member 268 to be received within the upwardly opening passage 134 defined by adaptor plate cylindrical member 132, as shown in FIG. 22, for pivotably mounting drive gear 252 to adaptor plate 108.

Figure 20:
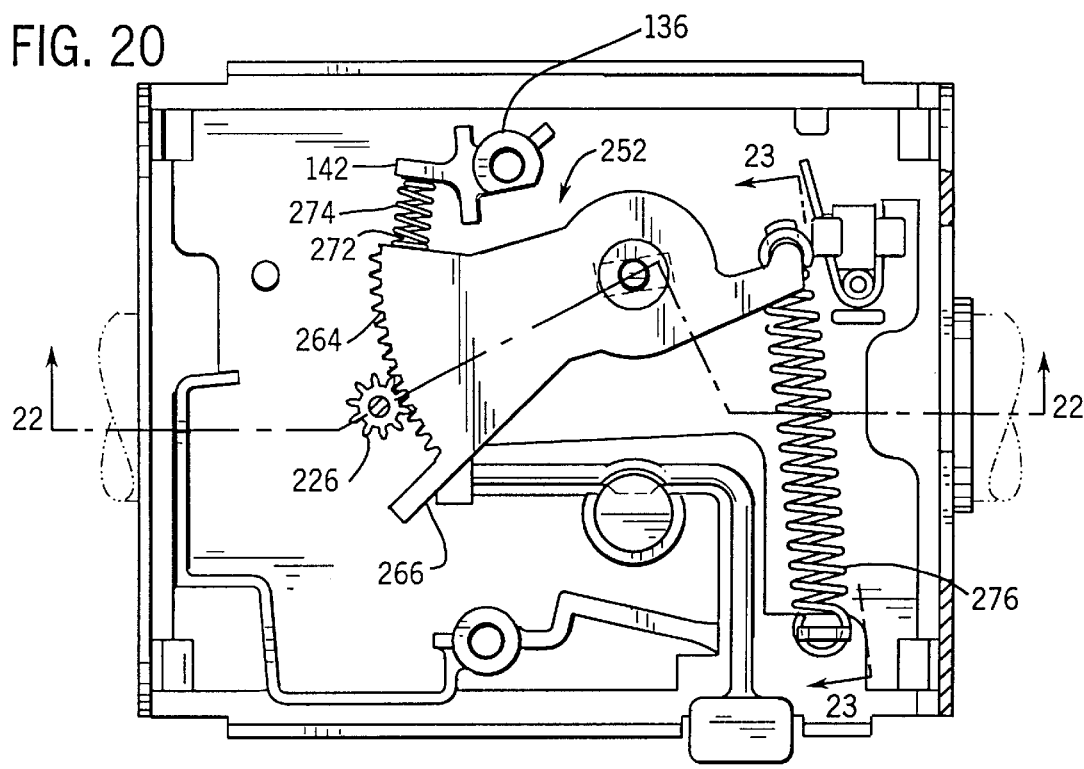
FIG. 20 is a top plan view similar to FIG. 5, with reference to line 20—20 of FIG. 22, showing the position of the components of the valve actuator of FIG. 18 for positioning the valve member of the valve body in its open position of FIG. 9.
Figure 21:
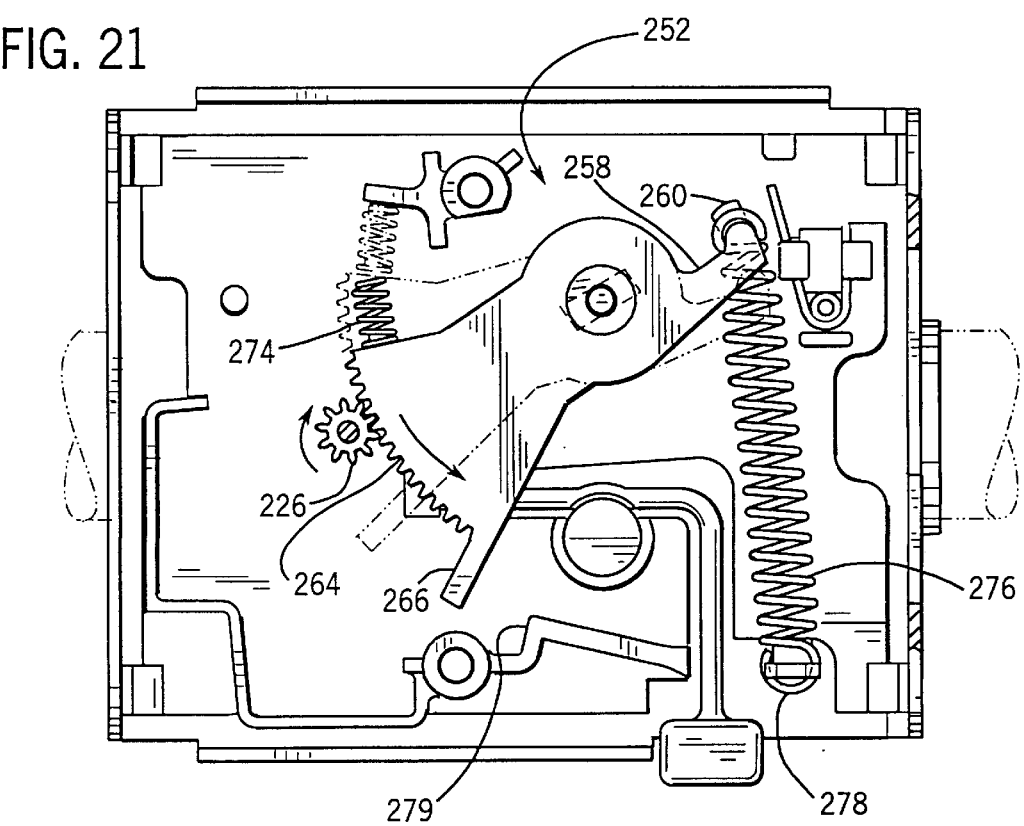
FIG. 21 is a view similar to FIG. 20, showing the position of the valve actuator components when moving the valve member of the valve body to its closed position of FIG. 7.

As shown in FIGS. 18, 20 and 21, drive gear 252 further includes a mounting boss 272 extending outwardly from the side of forward section 262 opposite stop arm 266. Mounting boss 272 extends into one end of a spring 274 in a friction-fit assembly, such that spring 274 is engaged with drive gear 252 and extends laterally outwardly therefrom.

Figure 22:
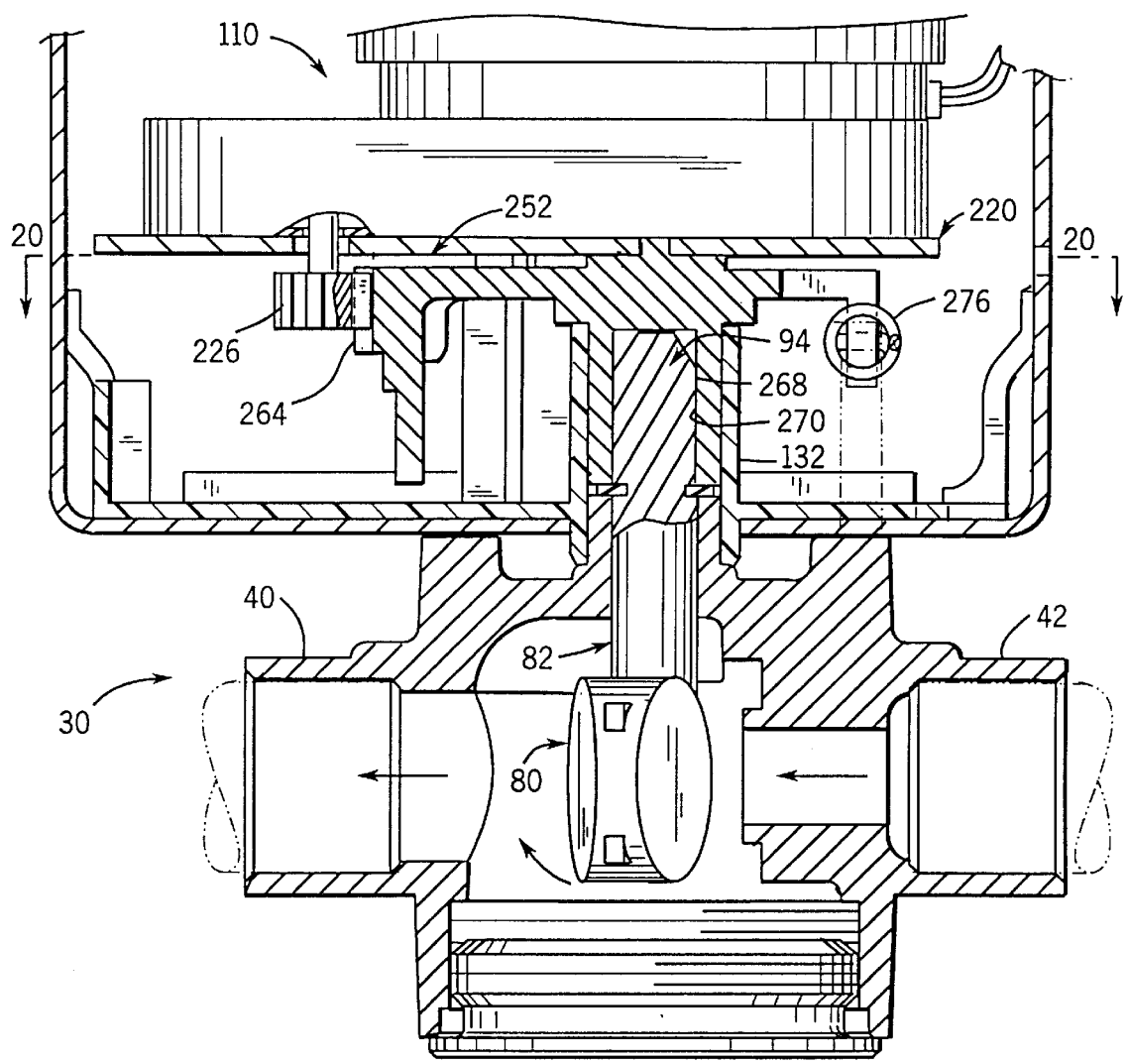
FIG. 22 is a section view taken along line 22—22 of FIG. 20.
Figure 23:
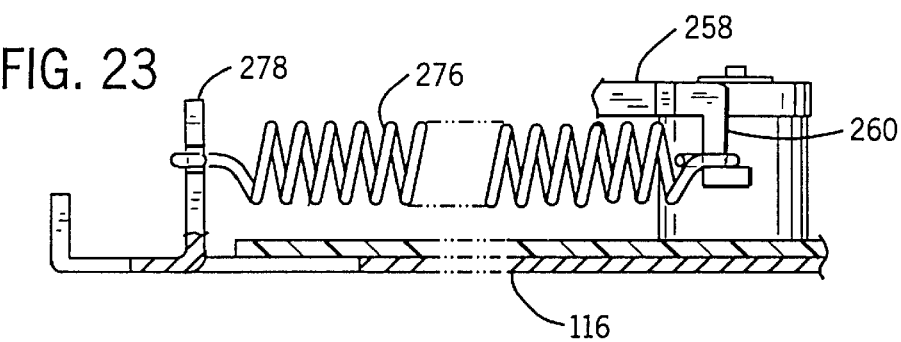
FIG. 23 is a partial section view taken along line 23—23 of FIG. 20.
Figure 24:
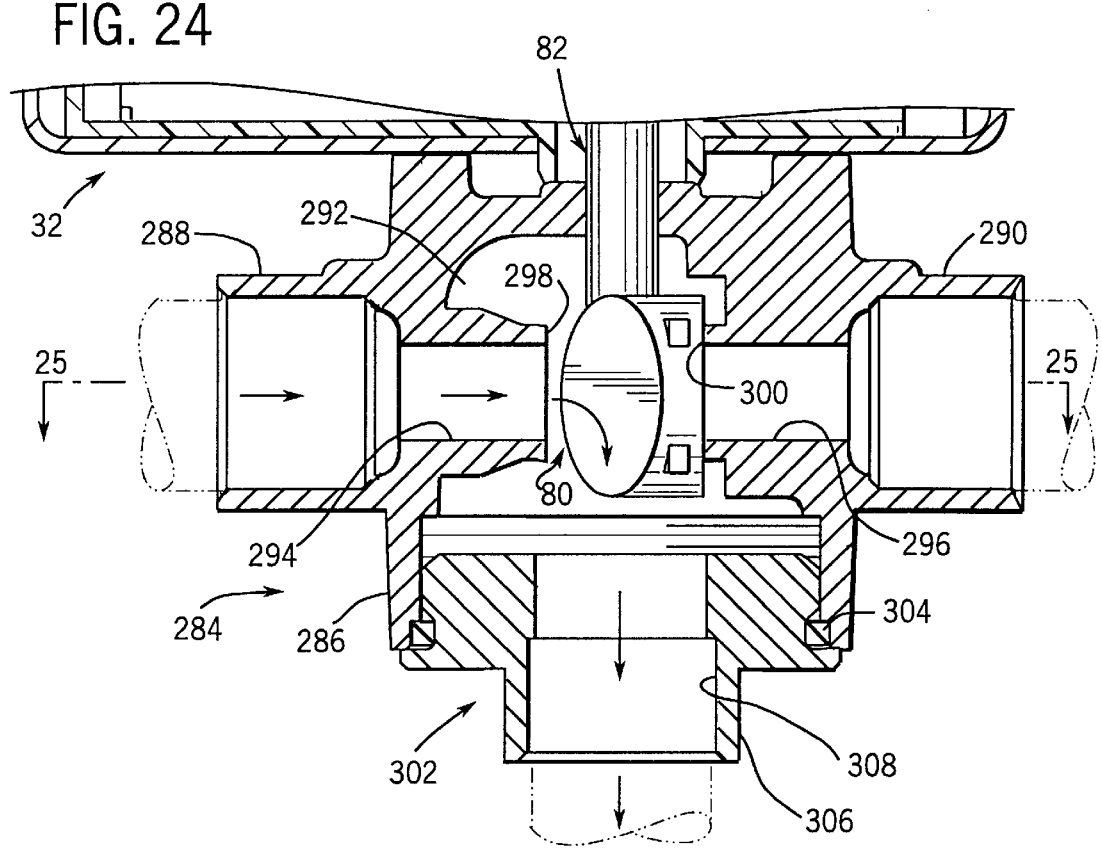
FIG. 24 is a section view illustrating a three-way valve body with which the valve actuator assembly of the invention can be employed.
Figure 25:
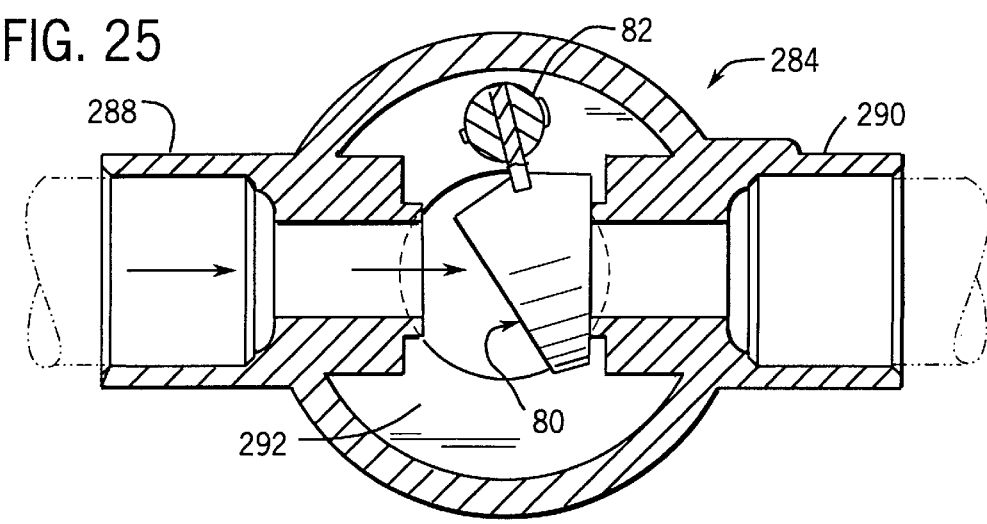
FIG. 25 is a section view taken along line 25—25 of FIG. 24, showing the valve member in a first closed position.
Figure 26:
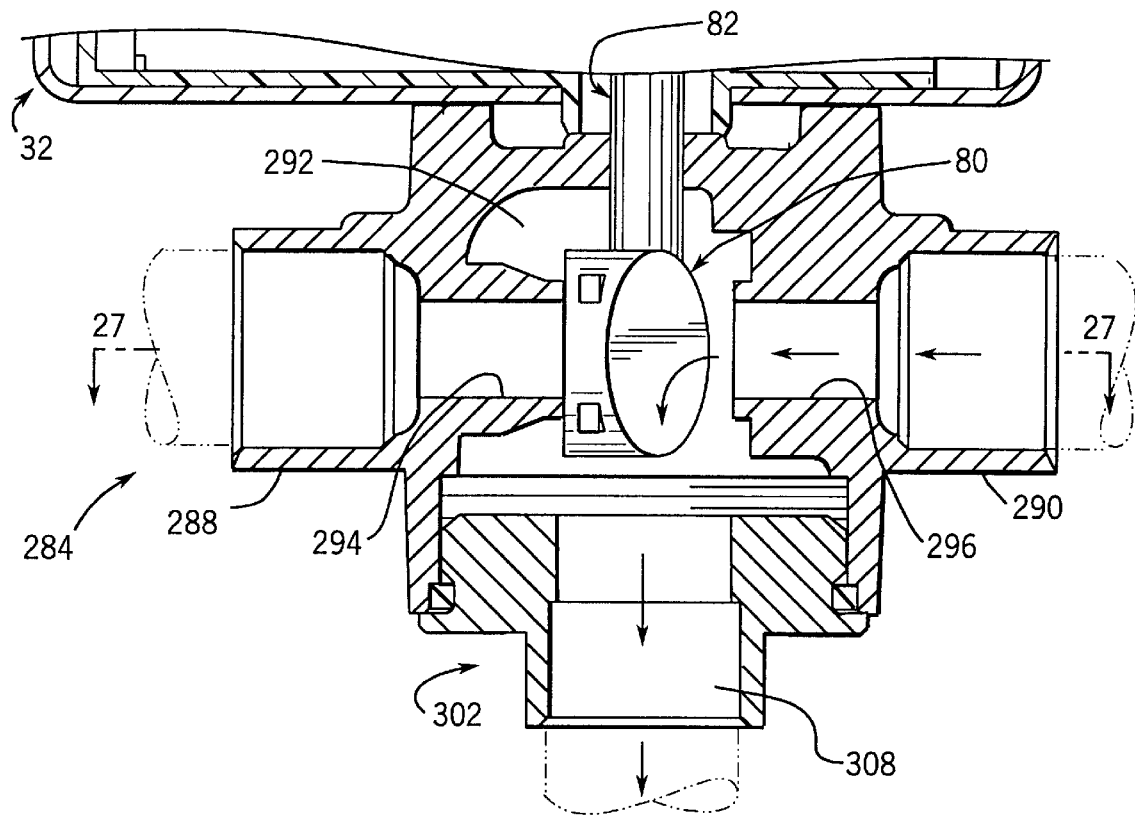
FIG. 26 is a view similar to FIG. 24, showing the position of the valve member in a second open position.
Figure 27:
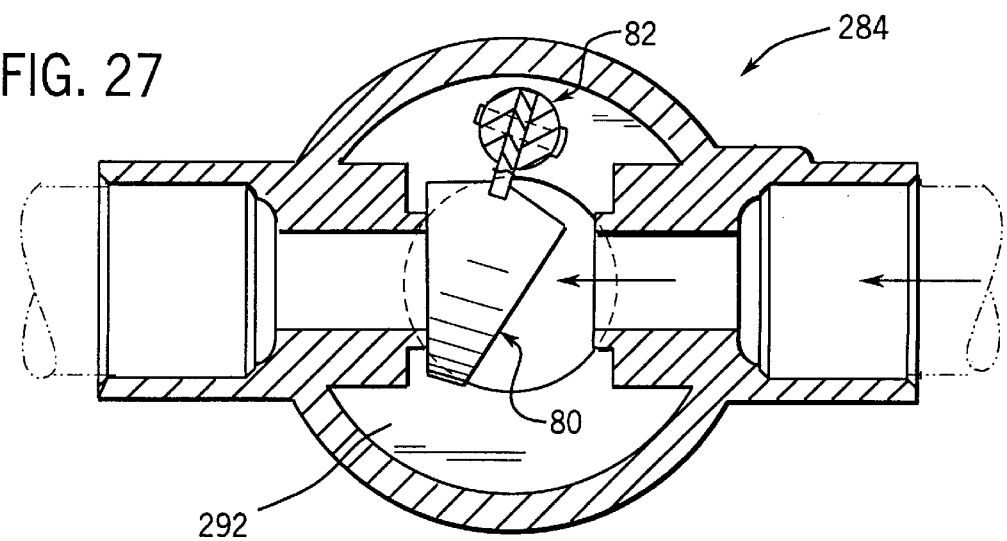
FIG. 27 is a section view taken along line 27—27 of FIG. 26.

FIGS. 20–22 illustrate drive gear 252 as mounted in actuator assembly 32' along with adaptor plate 108, motor assembly 110 and bearing plate 220, and as enclosed by lower housing section 114 and upper housing section 122. Drive gear 252, with spring 274 mounted to mounting boss 272, is mounted to adaptor plate 108 via mounting member 268 extending into passage 134 of adaptor plate cylindrical member 132, for pivotably mounting drive gear 252 to adaptor plate 108. Motor assembly 110 and bearing plate 220 are installed over drive gear 252 and are mounted to adaptor plate 108 in the same manner as described with respect to valve actuator 32, such that fasteners 232 securely mount motor assembly 110 and bearing plate 220 to adaptor plate bosses 136, 138. Drive gear mounting stud 256 is received within opening 236 of adaptor plate 220, such that drive gear 252 is sandwiched between bearing plate 220 and the upper end of cylindrical member 132, and is mounted for pivoting movement to bearing plate 220 and to cylindrical member 132. Motor drive gear 226 is engaged with gear teeth 264 of drive gear 252.

A tension spring 276 is connected with drive gear 252 via engagement with finger 260 on rearwardly extending arm 258 formed on drive gear 252. The opposite end of tension spring 276 is connected to an upstanding engagement tab 278 defined by bottom wall 116 of lower housing section 114. Engagement tab 278 is formed of an upwardly bent cut-out section formed in bottom wall 116, with indentations toward its upper end for receiving the end of tension spring 276.

Valve actuator assembly 32' is mounted to valve body 30 in the same manner as valve actuator assembly 32 as shown and described previously. When valve actuator assembly 32' is mounted to valve body 30, valve stem connector portion 94 is received within upwardly extending slot 270 formed in drive gear mounting member 268 as shown in FIG. 22, so as to drivingly engage drive gear 252 with valve stem 82. Spring 276 functions to bias drive gear 252 toward its position of FIG. 20, in which drive gear 252 functions to place valve member 80 in its open position as illustrated in FIG. 9. When it is desired to close valve body 32 to prevent fluid flow therethrough, motor 222 is operated so as to rotate its output drive gear 226 clockwise as shown in FIG. 21, which results in counterclockwise rotation of drive gear 252 via engagement of the teeth of motor output drive gear 226 with drive gear teeth 264. This movement of drive gear 252 causes extension of tension spring 276, such that drive gear 256 is rotated against the bias of tension spring 276. Drive gear 252 is rotated by operation of motor 222 until drive gear 252 is placed in a position in which valve member 80 is in its closed position as shown in FIG. 7, at which time power is continued to be supplied to motor 222 to maintain valve member 80 closed, until motor 222 receives a signal for valve member 80 to be returned to its open position, such that power to motor 222 is cut off. When this occurs, the biasing force of spring 276 functions to return drive gear 252 to its position of FIG. 20 in which valve member 80 is in its open position of FIG. 9. Spring 274 engages the facing surface of rib 142 as drive gear 252 approaches its position of FIG. 20 to gradually slow movement of drive gear 252 as valve member 80 approaches its fully open position. Drive gear stop arm 266 engages a stop surface 279 provided on adaptor plate 108 to provide a positive stop for drive gear 252 and to maintain drive gear 252 in a predetermined position to provide a constant predetermined open position for valve member 80.

As can be appreciated from a comparison of FIGS. 5 and 20, gear teeth 178 of drive gear 112 engage the opposite side of motor output drive gear 226 than gear teeth 264 of drive gear 252. In this manner, the same motor assembly 110 can be used for both valve actuator 32 and valve actuator 32' for providing operation of valve body 30 in opposite directions. That is, motor 222 is unidirectional, providing clockwise rotation of output drive gear 226 for both valve actuator assembly 32 and valve actuator assembly 32'. The engagement of gear teeth 178 of drive gear 112 and gear teeth 264 of drive gear 252 with opposite sides of motor output drive gear 226 provides movement of drive gears 112, 252 in opposite directions upon operation of motor 222. This construction provides a highly efficient use of parts, in that all components except the drive gear and the biasing spring are the same for both a normally open and normally closed valve actuator for the same valve body.

While the drawings illustrate a torsion spring (198) for biasing normally closed drive gear 112 and a tension spring (276) for biasing normally open drive gear 252, it should be appreciated that any satisfactory type of spring arrangement could be used for biasing the drive gears. The particular construction shown and described was found to be desirable simply due to the geometry of the parts for the particular embodiment of the invention as illustrated and described.

In addition, it can be appreciated that the interchangeability of one type of valve actuator with another provides significant practical advantages. For example, a contractor or other user can separately stock valve bodies 30, normally closed valve actuator assemblies 32 and normally open valve actuator assemblies 32'. The contractor can then assemble the desired one of either normally closed valve actuator assembly 32 or normally open valve actuator assembly 32' to valve body 30, either on-site or in a warehouse or other storage facility, thus reducing the overall number of parts to be stocked and the cost for maintaining a requisite stock of normally open and normally closed valve assemblies. In addition, it is possible to change a valve assembly from normally closed to normally open even after installation in a line, simply by removing one actuator assembly and replacing it with another.

FIGS. 24–27 illustrate use of a valve actuator constructed according to the invention with a three-way valve body, shown generally at 284. Three-way valve body 284 is constructed generally similarly to two-way valve body 30 as shown and described previously. Generally, three-way valve body 284 includes a sidewall 286 having a pair of nipples 288, 290 extending outwardly therefrom in opposite directions. Sidewall 286 defines an internal cavity 292, and nipples 288, 290 communicate with internal cavity 292 via restricted passages 294, 296, respectively. Passages 294, 296 open onto internal facing end sealing surfaces 298, 300, respectively.

A plug member 302 is engaged within the open lower end of valve body 284 as defined by the lower extent of sidewall 286. Plug 302 includes external threads engageable with internal threads provided on the inside of sidewall 286, and a seal member 304 provides a fluid-tight seal of plug member 302 to valve body 284. Plug member 302 includes a nipple 306 defining an internal passage 308, which is in communication with valve body internal cavity 292. In a manner as is known, nipples 288, 290 and 306 are adapted to be plumbed into three separate lines.

Three-way valve body 284 includes bosses 56, 58, latching post structure 60 and valve stem boss or post structure 62 having the same arrangement and construction as illustrated with respect to valve body 30. In this manner, valve actuator 32 can be employed with three-way valve body 284 for controlling flow of fluid therethrough.

Three-way valve body 284 further includes a valve member 80 and a valve stem 82 with a connector portion 94, also as shown and described with respect to two-way valve body 30.

In a preferred embodiment, normally closed valve actuator assembly 32 is used to control operation of three-way valve body 284. When it is desired to establish communication between passage 294 and passage 308, power to motor 222 is cut off such that spring 198 moves valve member 80 to its FIG. 24 position so as to seal passage 296. When it is desired to establish communication between passage 296 and passage 308, motor 222 is operated to move valve member 80 to its position of FIGS. 26 and 27, to seal valve member 80 against sealing surface 298. This engagement of valve member 80 with sealing surface 298 occurs before valve member arm 172 with the end of rib 140, such that engagement of valve member 80 with sealing surfaces 298, 300 establish mechanical stops for valve member 80 in both directions. Power to motor 222 is maintained so long as it is desired to maintain valve member 80 in its position of FIG. 27. Once power is cut off, valve member 80 is returned to its position of FIG. 25 so as to once again establish communication between passages 294 and 308.

Figure 28:
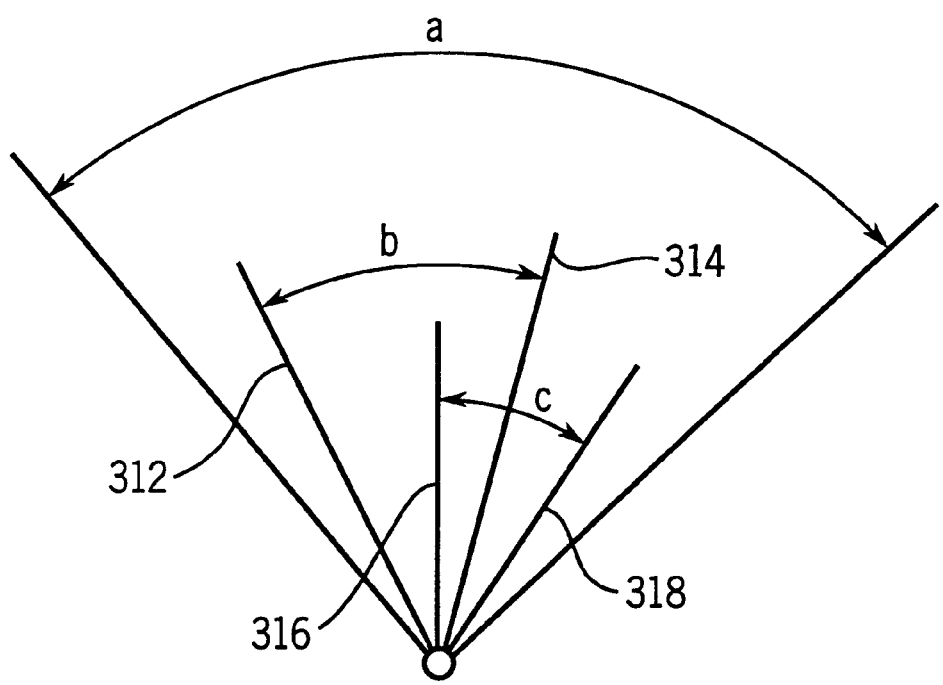
FIG. 28 is a schematic view representing the ranges of movement for the valve members for the valve bodies of FIGS. 7 and 9 and FIGS. 24–27, respectively.

As shown in FIG. 28, actuator 32 (or 32') has an overall range of movement illustrated by an angle a. Angle b represents the range of movement for valve member 80 in a two-way valve body 30, and angle c represents the range of movement for valve member 80 in a three-way valve body 284. Leg 312 of angle b is represented by engagement of drive gear arm 172 with the edge of rib 140, and leg 314 of angle b represents engagement of valve member 80 with sealing surface 239. Leg 316 of angle c represents engagement of valve member 80 with sealing surface 298, and leg 318 of angle c represents engagement of valve member 80 with sealing surface 300. It can thus be appreciated that mechanical stops are provided for valve member 80 within the range of movement of valve member 80 as controlled by actuator assembly 32 (or 32'), with the angular orientation of the stops being within the overall range of movement of the valve actuator. In this manner, the same valve actuator can be used to control operation of either a two-way or three-way valve.

It can also be appreciated that the valve actuator 32 can be engaged with and disengaged from the three-way valve body 284 in the same manner as described previously with respect to two-way valve body 30.

Various alternatives and embodiments are contemplated as being within the scope of the following claims particularly pointing out and distinctly claiming the subject matter regarded as the invention.

We claim:

1. A valve assembly, comprising:

a valve body defining an internal passage and including a valve member for controlling flow of fluid through the passage, wherein the valve member is mounted to an operating member movably mounted to the valve body for providing movement of the valve member, wherein the operating member includes an axially extending connector portion accessible from the exterior of the valve body;

an actuator assembly including a motor having an output and a drive mechanism; and a removable connection arrangement interposed between the valve body and the actuator assembly for providing removable interconnection of the actuator mechanism with the valve body, wherein, when the actuator assembly is connected to the valve body, the actuator assembly drive mechanism is interconnected with the connector portion of the operating member for providing movement of the operating member, and thereby movement of the valve member, in response to operation of the motor; and wherein the removable connection arrangement includes releasable engagement structure provided on both the valve body and the actuator assembly for providing manual push-on connection of the actuator assembly to the valve body in a direction substantially parallel to the longitudinal axis of the operating member connector portion, and further includes a manually engageable release member for disconnecting the actuator assembly from the valve body and enabling the actuator assembly to be manually removed from the valve body utilizing a pull-off force in a direction substantially parallel to the longitudinal axis of the operating member connector portion.

2. The valve assembly of claim 1, wherein the actuator assembly includes an adaptor plate to which the motor and the drive mechanism are mounted, and wherein the releasable engagement structure is provided on the valve body and the adaptor plate.

3. The valve assembly of claim 2, wherein the releasable engagement structure includes a protrusion provided on the valve body with which the adaptor plate is engaged.

4. The valve assembly of claim 3, wherein the operating member comprises a valve stem and the connector portion comprises an end portion of the valve stem protruding axially outwardly from the valve body, and wherein the protrusion provided on the valve body extends in an axial direction substantially parallel to the longitudinal axis of the end portion of the valve stem.

5. The valve assembly of claim 3, wherein the adaptor plate releasable engagement structure includes a movable engagement member provided on the adaptor plate and movable between an engaged position and a disengaged position.

6. The valve assembly of claim 5, wherein the releasable engagement structure further includes a locking arrangement interposed between the movable engagement member and the protrusion for securing the adaptor plate to the valve body when the movable engagement member is in its engaged position and for enabling the adaptor plate to be disengaged from the valve body when the movable engagement member is in its disengaged position.

7. The valve assembly of claim 6, wherein the locking arrangement comprises a notch formed in the protrusion and locking structure formed on the movable engagement member, wherein the locking structure is received within the notch when the movable engagement member is in its engaged position.

8. The valve assembly of claim 6, wherein the movable engagement member is formed integrally with the adaptor plate.

9. The valve assembly of claim 8, wherein the movable engagement member comprises an arm member defining a pair of ends and engageable with the protrusion when the movable engagement member is in its engaged position, wherein a first end of the arm member is formed integrally with the adaptor plate and wherein a second end of the arm member is movable in response to engagement by a user to place the movable engagement member in its disengaged position, wherein the integral formation of the first end of the arm member with the adaptor plate functions to bias the movable engagement member toward its engaged position.

10. The valve assembly of claim 9, wherein the arm member includes a first section extending from the first end of the arm member and a second section extending from the first section and terminating in the second end of the arm member, wherein the first section includes the locking structure engageable with the protrusion and movable out of engagement with the protrusion in response to exertion of a force on the second end of the arm member in a direction transverse to a longitudinal axis along which the first section of the arm member extends.

11. The valve assembly of claim 10, wherein the second section of the arm member extends along a longitudinal axis transverse to the longitudinal axis along which the first section of the arm member extends, wherein application of an axial force to the second section of the arm member functions to cause lateral deflection of the first section of the arm member to disengage the locking structure from the protrusion.

12. The valve assembly of claim 1, wherein the releasable engagement structure includes a protrusion provided on the valve body with which the actuator assembly is engageable, and further comprising engagement structure provided on both the actuator assembly and the valve body, separate from the releasable engagement structure, for locating and maintaining the actuator assembly in a predetermined position relative to the valve body along the longitudinal axis of the operating member connector portion.

13. The valve assembly of claim 12, wherein the engagement structure comprises an upstanding engagement member formed on the valve body and defining an engagement structure engageable with the actuator assembly.

14. A valve assembly comprising:
a valve body defining an internal passage and including a valve member for controlling flow of fluid through the passage, wherein the valve member is mounted to a valve stem movably mounted to the valve body for providing movement of the valve member, wherein the valve stem includes a connector portion accessible from the exterior of the valve body;
an actuator assembly including a motor having an output and a drive mechanism; and
a mounting arrangement for mounting the actuator assembly to the valve body, including a latching member provided on the valve body, latch structure provided on the actuator assembly and releasably engageable with the latching member for releasably securing the actuator to the valve body, and mating engagement structure provided on both the actuator assembly and the valve body, separate from the latching member and the latch structure, for locating and maintaining the actuator assembly in a predetermined position relative to the valve body.

15. The valve assembly of claim 14, wherein the mating engagement structure comprises a protrusion formed on the valve body and a mating recess provided on the actuator assembly, wherein the recess receives the protrusion.

16. The valve assembly of claim 15, wherein the latching member provided on the valve body comprises an upstanding member separate from the protrusion.

17. The valve assembly of claim 16, wherein the latching member is laterally offset in a first direction from a longitudinal axis defined by the valve body, and wherein the protrusion and the connector portion of the valve stem are laterally offset in a second direction from the longitudinal axis of the valve body.

18. The valve assembly of claim 15, wherein the connector portion of the valve stem extends from the protrusion and is pivotably mounted thereto.

19. The valve assembly of claim 16, wherein the actuator assembly includes an adaptor plate to which the motor and drive mechanism are mounted, and wherein the latch structure is provided on the adaptor plate.

20. The valve assembly of claim 19, wherein the latch structure comprises a latch arm formed integrally with the adaptor plate and movable between an engaged position in which the latch arm is engaged with the upstanding latching member for securing the actuator assembly to the valve body, and a disengaged position in which the latch arm is disengaged from the upstanding latching member for enabling the actuator assembly to be removed from the valve body.

21. In a valve including a valve body defining an internal passage, a valve member, a valve stem pivotably mounted to the valve body and to which the valve member is mounted, and an actuator assembly including a motor having an output drive gear, a method of controlling the direction of operation of the valve member, comprising the steps of:

provided an adaptor plate for connection to the valve body;

providing a first drive gear having gear teeth facing in a first direction;

providing a second drive gear having gear teeth facing in a second direction opposite the first direction;

pivotably mounting a selected one of the first and second drive gears to the adaptor plate such that the selected drive gear is interconnected with the valve stem;

mounting the motor to the adaptor plate such that the output drive gear of the motor engages the gear teeth of the drive gear, wherein the gear teeth of the first drive gear engage one side of the output drive gear for providing movement of the first drive gear in a first direction in response to operation of the motor, and wherein the gear teeth of the second drive gear engage a side of the output drive gear opposite the side of the output drive gear engaged by the first drive gear for providing movement of the second drive gear in a second direction opposite the first direction in response to operation of the motor.

22. The method of claim 21, wherein the valve member is mounted to the valve body for movement between an open position for providing flow of fluid through the passage and a closed position for preventing flow of fluid through the passage, and further comprising the step of interconnecting a spring with the selected drive gear for biasing the selected drive gear toward one of the open and closed positions.

23. The method of claim 22, wherein the step of interconnecting a spring with the drive gear is carried out by mounting a torsion spring to gear mounting structure associated with the adaptor plate and to which the selected gear is pivotably mounted, and interconnecting the torsion spring with the selected gear.

24. The method of claim 22, wherein the step of interconnecting a spring with the selected drive gear is carried out by connecting an extension spring between the selected drive gear and the adaptor plate.

25. The method of claim 21, wherein the first drive gear comprises a first sector gear including a pivot axis and a series of arcuate outwardly facing teeth spaced from the pivot axis, and wherein the second drive gear comprises a second sector gear including a pivot axis and a series of arcuate inwardly facing teeth spaced from the pivot axis.

26. The method of claim 25, wherein the step of pivotably mounting a selected one of the first and second drive gears to the adaptor plate is carried out by providing mounting structure on the adaptor plate defining a passage within which the valve stem is received, and pivotably mounting the selected drive gear to the mounting structure.

27. The method of claim 21, further comprising the step of removably connecting the adaptor plate to the valve body such that the actuator assembly can be engaged with and disengaged from the valve body.

28. In a valve including a valve body defining an internal passage, a valve member, a valve stem pivotably mounted to the valve body and to which the valve member is mounted, and an actuator assembly including a motor having an output drive gear a method of controlling the direction of operation of the valve member, comprising the steps of:

providing an adaptor plate for connection to the valve body;

providing a first drive gear having gear teeth facing in a first direction;

providing a second drive gear having gear teeth facing in a second direction opposite the first direction;

pivotably mounting a selected one of the first and second drive gears to the adaptor plate such that the selected drive gear is interconnected with the valve stem;

mounting the motor to the adaptor plate such that the output drive gear of the motor engages the gear teeth of the drive gear, wherein the gear teeth of the first drive gear engage one side of the output drive gear for providing movement of the first drive gear in a first direction in response to operation of the motors and wherein the gear teeth of the second drive gear engage a side of the output drive gear opposite the side of the output drive gear engaged by the first drive gear for providing movement of the second drive gear in a second direction opposite the first direction in response to operation of the motor; and removably connecting the adaptor plate to the valve body such that the actuator assembly can be engaged with and disengaged from the valve body by providing engagement structure on an arm provided on the adaptor plate, wherein the arm is mounted to the adaptor plate for movement between an engaged position and a disengaged position, and providing an engagement member on the valve body with which the engagement structure is engaged when the arm is in its engaged position for securing the actuator assembly to the valve body, wherein movement of the arm to its disengaged position releases engagement of the engagement structure with the engagement member to disengage the actuator assembly from the valve body.

29. In a valve including a valve body defining an internal passage, a valve member, a valve stem pivotably mounted to the valve member and to which the valve member is mounted, a method of controlling the direction of operation of the valve, comprising the steps of:

providing a first actuator assembly including a motor having an output and a first drive member engaged with the motor output, wherein operation of the motor functions to move the first drive member in a first direction;

providing a second actuator assembly including a motor having an output and a second drive member engaged with the motor output, wherein operation of the motor functions to move the second drive member in a second direction opposite the first direction; and connecting either the first actuator assembly to the valve body such that the first drive member is interconnected with the valve stem, or connecting the second actuator assembly to the valve body such that the second drive member is interconnected with the valve stem, wherein operation of the motor of the first actuator assembly pivots the valve stem in a first direction of rotation when the first actuator assembly is connected to the valve body, and wherein operation of the motor of the second actuator assembly pivots the valve stem in a second direction of rotation opposite the first direction of rotation when the second actuator assembly is connected to the valve body.

30. The method of claim 29, wherein the valve member is movable between an open position for providing flow of fluid through the passage and a closed position for preventing flow of fluid through the passage, and wherein the first actuator assembly includes a spring interconnected with the first drive member for biasing the first drive member in the second direction and wherein the second actuator assembly includes a spring interconnected with the second drive member for biasing the second drive member in the first direction, and wherein connecting the first actuator assembly to the valve body functions to bias the valve member toward one of its normally closed or normally open positions under the influence of the spring of the first actuator assembly, wherein operation of the motor of the first actuator assembly functions to move the valve member away from the position toward which it is biased, and wherein mounting the second actuator assembly functions to bias the valve member toward the other of its normally closed or normally open positions under the influence of the spring of the second actuator member, wherein operation of the motor of the second actuator assembly functions to move the valve member away from the position toward which it is biased under the influence of the spring of the second actuator assembly.

31. The method of claim 29, wherein the first drive member of the first actuator assembly comprises a gear having a series of gear teeth facing in a first direction and wherein the second drive member of the second actuator assembly comprises a gear having a series of gear teeth facing in a second direction opposite the first direction.

32. The method of claim 31, wherein the step of providing a first actuator assembly and the step of providing a second actuator assembly are both carried out by providing an adaptor plate having the same construction for each of the first and second actuator assemblies and providing an identical motor for each of the first and second actuator assemblies.

33. In a valve including a valve body defining an internal passage, a valve member, and a valve stem pivotably mounted to the valve body and to which the valve member is mounted for movement between an open position for providing flow of fluid through the passage and a closed position for preventing flow of fluid through the passage, and an actuator assembly including a motor having a drive member engaged with the valve stem and a spring for biasing the valve member, through the drive member, in a first direction so as to normally position the valve member in either its open position or its closed position, wherein operation of the motor moves the valve member in a second direction opposite the first direction against the force of the spring, the improvement comprising:

providing a removable connection arrangement between the actuator assembly and the valve body;

removing the actuator assembly from the valve body; and connecting a second actuator assembly to the valve body, wherein the second actuator assembly includes a motor having a second drive member engaged with the valve stem and a second spring for biasing the valve member, through the second drive member, in the second direction opposite the first direction to normally position the valve member in either its closed position or its open position, and wherein operation of the motor of the second actuator assembly moves the valve member in the first direction against the force of the second spring.

34. In a valve including a valve body defining an internal passage, a valve member, and a valve stem pivotably mounted to the valve body and to which the valve member is mounted for movement between an open position for providing flow of fluid through the passage and a closed position for preventing flow of fluid through the passage, and an actuator assembly including a motor having a drive member engaged with the valve stem and a spring for biasing the valve member, through the drive member, in a first direction so as to normally position the valve member in either its open position or its closed position the improvement comprising:

providing a removable connection arrangement between the actuator assembly and the valve body by providing an engagement member on the valve body and providing movable engagement structure on the actuator assembly for movement between an engaged position in which the engagement structure is engaged with the engagement member for securing the actuator assembly to the valve body and a disengaged position in which the engagement structure is disengaged from the engagement member for enabling the actuator assembly to be removed from the valve body;

removing the actuator assembly from the valve body; and connecting a second actuator assembly to the valve body, wherein the second actuator assembly includes a motor having a second drive member engaged with the valve stem and a second spring for biasing the valve member, through the second drive member, in a second direction opposite the first direction to normally position the valve member in either its closed position or its open position.

35. The method of claim 34, wherein the step of connecting the second actuator assembly to the valve body is carried out via movable engagement structure on the second actuator assembly having a construction identical to the movable engagement structure on the first-mentioned actuator assembly.

36. The method of claim 35, wherein each of the first-mentioned and second actuator assemblies includes an adaptor plate to which the respective motors and drive members of the first-mentioned and second actuator assemblies are mounted, wherein the adaptor plate of the first-mentioned actuator assembly is identical in construction to the adaptor plate of the second actuator assembly.

37. The method of claim 36, wherein the movable engagement structure on the first-mentioned and second actuator assemblies is provided on the adaptor plate of each actuator assembly.

38. A valve actuator for use with at least two different valve bodies, wherein a first one of the valve bodies includes first external engagement structure, a first valve member, and a first valve stem to which the first valve member is mounted, wherein the first valve stem is movable through a first range of operating positions for moving the first valve member between first and second positions, and wherein a second one of the valve bodies includes second external engagement structure, a second valve member, and a second valve stem to which the second valve member is mounted, wherein the second valve stem is movable through a second range of operating positions different from the first range of operating positions for moving the second valve member between first and second positions, the valve actuator comprising:

engagement structure on the valve actuator which is engageable with both the first external engagement structure of the first valve body and with the second external engagement structure of the second valve body for securing the valve actuator to either the first or second valve body, wherein the engagement structure includes a movable engagement member which is movable between an engaged position for engaging either the first or the second engagement structures for securing the valve actuator to either the first or the second valve body, and a disengaged position in which the engagement member is disengaged from either the first or the second engagement structures for enabling the valve actuator to be removed from either the first or the second valve body;

a motor having an output; and a drive mechanism drivingly engaged with the motor output and with the valve stem of the first valve body when the valve actuator is mounted thereto and with the valve stem of the second valve body when the valve actuator is mounted thereto, wherein the drive mechanism functions to move the first valve stem through the first range of operating positions when the valve actuator is mounted to the first valve body and functions to move the second valve stem through the second range of operating positions when the valve actuator is mounted to the second valve body.

39. The valve actuator of claim 38, wherein the first valve body comprises a two-way valve body having a pair of internal openings, wherein the first valve member is movable between a closed position in which the first valve member is located over one of the internal openings for preventing flow of fluid through the valve body and an open position establishing communication between the pair of internal openings to allow flow of fluid through the valve body, and wherein the second valve body comprises a three-way valve body having three internal openings, wherein the second valve member is movable between a first position in which the second valve member is located over a first one of the internal openings to allow flow of fluid between the other two internal openings and a second position in which the second valve member is located over a second one of the internal openings to allow flow of fluid between the other two internal openings.

40. The valve actuator of claim 39, further comprising a stop arrangement associated with the valve actuator for stopping movement of the first valve member when the valve actuator is mounted to the first valve body when the first valve member attains a predetermined open position.

41. The valve actuator of claim 40, wherein, when the valve actuator is mounted to the second valve body, engagement of the second valve member with the first and second internal openings functions to limit movement of the valve member.

42. The valve actuator of claim 39, further comprising a removable connection arrangement interposed between the valve actuator and each of the first and second valve bodies for providing movable interconnection of the valve actuator with each valve body.

43. A valve actuator for use with at least two different valve bodies wherein a first one of the valve bodies includes first external engagement structure, a first valve member, and a first valve stem to which the first valve member is mounted, wherein the first valve stem is movable through a first range of operating positions for moving the first valve member between first and second positions, and wherein a second one of the valve bodies includes second external engagement structure, a second valve member, and a second valve stem to which the second valve member is mounted, wherein the second valve stem is movable through a second range of operating positions different from the first range of operating positions for moving the second valve member between first and second positions, the valve actuator comprising:

engagement structure engageable with both the first external engagement structure of the first valve body and with the second external engagement structure of the second valve body for securing the valve actuator to either the first or second valve body;

a motor having an output;

a drive mechanism drivingly engaged with the motor output and with the valve stem of the first valve body when the valve actuator is mounted thereto and with the valve stem of the second valve body when the valve actuator is mounted thereto, wherein the drive mechanism functions to move the first valve stem through the first range of operating positions when the valve actuator is mounted to the first valve body and functions to move the second valve stem through the second range of operating positions when the valve actuator is mounted to the second valve body; and a removable connection arrangement interposed between the valve actuator and each of the first and second valve bodies for providing removable interconnection of the valve actuator with each valve body, wherein the removable connection arrangement includes a latching member provided on each valve body, latch structure provided on the valve actuator and engageable with the latching member of each valve body for securing the valve actuator to the valve body, and mating engagement structure provided on the valve actuator and each of the valve bodies for locating and maintaining the actuator in a predetermined position relative to the valve body to which the valve actuator is mounted;

wherein the first valve body comprises a two-way valve body having a pair of internal openings, wherein the first valve member is movable between a closed position in which the first valve member is located over one of the internal openings for preventing flow of fluid through the valve body and an open position establishing communication between the pair of internal openings to allow flow of fluid through the valve body, and wherein the second valve body comprises a three-way valve body having three internal openings, wherein the second valve member is movable between a first position in which the second valve member is located over a first one of the internal openings to allow flow of fluid between the other two internal openings and a second position in which the second valve member is located over a second one of the internal openings to allow flow of fluid between the other two internal openings.

44. The valve actuator of claim 43, wherein the valve actuator includes an adaptor plate to which the motor and the drive mechanism are mounted, and wherein the latch structure provided on the valve actuator comprises a latch arm formed integrally with the adaptor plate and movable between an engaged position in which the latch arm is engaged with the valve body latching member for securing the valve actuator to the valve body, and a disengaged position in which the latch arm is disengaged from the valve body latching member for enabling the valve actuator to be removed from the valve body.

45. A valve assembly, comprising:

a valve body defining an internal cavity and an inlet and an outlet in fluid communication with the internal cavity;

a valve member disposed within the internal cavity and including a valve stem pivotably mounted to the valve body for providing movement of the valve member to control fluid flow through the internal cavity, wherein the valve stem includes a connector portion accessible from the exterior of the valve body;

an actuator assembly releasably engageable with the valve body and including a drive arrangement engageable with the connector portion of the valve stem when the actuator assembly is engaged with the valve body, wherein the actuator assembly is releasably engageable with the valve body via releasable engagement structure providing engagement of the actuator assembly with the valve body using a push-on force substantially parallel to a longitudinal axis defined by the connector portion of the valve stem, and wherein the actuator assembly includes a manually engageable release member for disengaging the actuator assembly from the valve body and enabling the actuator assembly to be removed from the valve body using a pull-off force in a direction substantially parallel to the longitudinal axis of the connector portion of the valve stem.

46. The valve assembly of claim 45, wherein the releasable engagement structure comprises a protrusion provided on the valve body with which the release member is engageable for connecting the actuator assembly to the valve body, and wherein the release member is movable out of engagement with the protrusion to enable the actuator assembly to be removed from the valve body.

47. The valve assembly of claim 46, wherein the valve body includes a boss through which the valve stem extends, and wherein the protrusion is spaced from the boss.

48. The valve assembly of claim 47, wherein the valve body defines a longitudinal axis oriented substantially transverse to the longitudinal axis along which the valve stem extends, and wherein the protrusion and the boss are located on opposite sides of the longitudinal axis of the valve body.

49. The valve assembly of claim 47, wherein the valve body further includes a pair of spaced engagement members engageable with the actuator assembly when the actuator assembly is engaged with the valve body for providing stability to the actuator assembly.

50. The valve assembly of claim 46, wherein the protrusion includes a notch within which the release member is engageable for securing the actuator assembly to the valve body, wherein the release member is movable out of engagement with the notch for enabling the actuator assembly to be disengaged from the valve body.

51. The valve assembly of claim 48, wherein the protrusion and the boss each define a shoulder, and wherein the actuator assembly includes structure engageable with the shoulder of the protrusion and with the shoulder of the boss for locating the actuator assembly in a predetermined position along the longitudinal axis of the valve stem when the actuator assembly is engaged with the valve body.

* * * * *